US008140079B2

(12) United States Patent
Olson

(10) Patent No.: US 8,140,079 B2
(45) Date of Patent: Mar. 20, 2012

(54) SYSTEM AND METHOD TO FACILITATE HANDOVER

(75) Inventor: Timothy S. Olson, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 1036 days.

(21) Appl. No.: 11/778,831

(22) Filed: Jul. 17, 2007

(65) Prior Publication Data
US 2008/0076430 A1 Mar. 27, 2008

Related U.S. Application Data

(60) Provisional application No. 60/820,896, filed on Jul. 31, 2006.

(51) Int. Cl.
*H04W 36/00* (2009.01)
*H04W 24/00* (2009.01)
*H04W 40/00* (2009.01)

(52) U.S. Cl. ............ 455/440; 455/456.1; 455/442; 455/436; 455/443; 455/444; 455/449

(58) Field of Classification Search .......... 455/440
See application file for complete search history.

(56) References Cited

U.S. PATENT DOCUMENTS

| 6,477,372 | B1 | 11/2002 | Otting et al. |
| 6,915,123 | B1* | 7/2005 | Daudelin et al. ............ 455/410 |
| 2004/0146035 | A1 | 7/2004 | Lee et al. |
| 2004/0264414 | A1 | 12/2004 | Dorenbosch |
| 2005/0107085 | A1 | 5/2005 | Ozluturk |
| 2005/0250496 | A1 | 11/2005 | Hason et al. |
| 2006/0025151 | A1 | 2/2006 | Karaoguz et al. |
| 2006/0150250 | A1 | 7/2006 | Lee et al. |
| 2006/0203789 | A1 | 9/2006 | Iacono et al. |
| 2006/0287003 | A1 | 12/2006 | Moinzadeh et al. |
| 2007/0021126 | A1* | 1/2007 | Nanda et al. ............ 455/456.1 |
| 2007/0072610 | A1 | 3/2007 | Qiao et al. |
| 2007/0115899 | A1* | 5/2007 | Ovadia et al. ............ 370/338 |

OTHER PUBLICATIONS

PCT International Search Report mailed Feb. 29, 2008.
PCT Written Opinion of the International Searching Authority Feb. 29, 2008.

* cited by examiner

*Primary Examiner* — Dwayne Bost
*Assistant Examiner* — Timothy Pham
(74) *Attorney, Agent, or Firm* — Tarolli, Sundheim, Covell & Tummino LLP

(57) ABSTRACT

A method to facilitate handover includes detecting that a mobile unit resides within at least one predetermined zone where a handover event from a first radio technology to a second radio technology may need to occur, the second radio technology being different from the first radio technology.

35 Claims, 8 Drawing Sheets

SYSTEM AND METHOD TO FACILITATE HANDOVER

RELATED APPLICATION

The present application claims the benefit of U.S. Provisional Patent Application No. 60/820,896, which was filed on Jul. 31, 2006, and entitled "Mobility Fingerprinting," the entire contents of which are incorporated herein by reference.

TECHNICAL FIELD

The present invention relates generally to communications and, more particularly, to a system and method to facilitate handover.

BACKGROUND

Various types of wireless technologies have been developed for communication of voice, data and a combination of voice and data. Many wireless devices are being manufactured to enable operability in more than one type of technology. For example, portable electronic devices, such as cellular telephones and personal digital assistants, can include interfaces that enable operation using cellular technologies, wireless local area network (WLAN) technologies, and/or Bluetooth technologies to name a few.

As a further example, many enterprise networks support voice over internet protocol (VoIP) that can run over one or more wireless network. For instance, WiFi voice networks currently support VoIP and, with little integration, with a wider area voice network, such as cellular networks. Dual mode phones, which have both an 802.11 interface and a cellular interface, are emerging in the marketplace.

SUMMARY

The invention relates generally to a system and method to facilitate handover for a mobile unit between radio technologies. As a further example, the invention enables a determination to be made whether a mobile unit resides in an area where a handoff from a first radio technology to a second radio technology may be desired. The area or location where the handoff may be needed is predetermined such as to provide sufficient time to enable the system to set up the call on a new interface prior to the old interface becoming unusable. The result of this evaluation can then be made available for a higher level mobility functions that determine on which radio technology interface communication should take place.

One aspect of the invention provides a method to facilitate handover that includes detecting that a mobile unit resides within at least one predetermined location where a handover event from a first radio technology to a second radio technology may need to occur, the second radio technology being different from the first radio technology.

Another aspect of the invention provides system to facilitate handover. The system includes a mobile unit configured to operate according to at least first and second radio technologies. A fingerprint detector evaluates input data (e.g., corresponding to scanned signals) relative to mobility fingerprint data that defines at least one predetermined roam zone to determine whether a handover between the first and second radio technologies should occur for the mobile unit.

Yet another aspect of the invention provides a system to facilitate handover for a mobile unit. The system includes means for storing fingerprint data that define a mobility fingerprint for at least one predetermined roam zone. The system also includes means for evaluating whether to trigger a handoff for the mobile unit from a first (e.g., currently connected) radio technology to a second radio technology based on at least one received signal relative to the stored fingerprint data.

DETAILED DESCRIPTION

Figure 1:
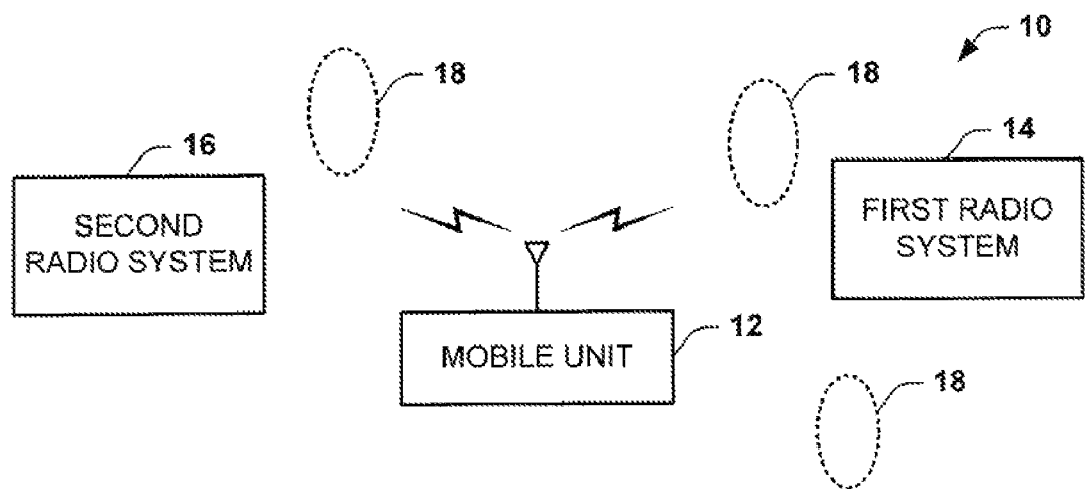
FIG. 1 depicts an example of a system that can be implemented according to an aspect of the invention.

The invention relates generally to a system and method to facilitate handover between different radio technologies. The invention facilitates handover by enabling a location to be detected where such handover may need to occur. For instance, one or more signals can be detected to identify the location, and a trigger signal can be generated to enable handover to occur in response to identifying the location.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The invention relates to a system and method to facilitate handover for a mobile unit between different radio technologies. As used herein, the term "radio technology" and variations of this term are intended to encompass any form of wireless communication that may be utilized to send, to receive or to send and receive audio signals (including voice signals), data signals or a combination of voice and data signals without requiring a hard-wired connection. Examples of different radio technologies include cellular telephones (e.g., 2G, 3G or 4G technologies), wireless networks, (e.g., wireless local area networks (WLAN), such as WiFi; wireless metropolitan area networks (WirelessMAN), such as WiMax; and any variation and improvements thereof), satellites, Bluetooth, two-way (or half-duplex) radio, and any combinations thereof. Those skilled in the art will understand and appreciate that various standards and protocols exist and have yet to be developed to enable communication via these and other radio technologies. For example, the mobile unit can be implemented in any form of wireless technology, such as including a cellular telephone, personal digital assistant (PDA), a portable computer (e.g., a laptop computer, or tablet computer) and the like. In the following example, it is assumed that the mobile unit is configured to enable operation using at least two different radio technologies.

The approach described herein enables a determination to be made that a mobile unit resides in an area where a handoff from a first radio technology to a second radio technology may be desired. The area or location where the handoff may be needed is predetermined such as to provide sufficient time to enable the system to set up the call on a new interface prior to the old interface becoming unusable. The predetermined location where handoff may be needed is referred to herein as mobility fingerprint. As used herein, the general term "mobility fingerprint" can correspond to any method used to identify a roam zone where handoff may be required. The mobility fingerprint can be evaluated by a fingerprint detection algorithm, such as based on periodic or intermittent monitoring of one or more inputs. Fingerprint evaluation is a generic technique that may be applied from either the client device or the network infrastructure. The result of this evaluation can then be made available for a higher level mobility functions that determine on which radio technology interface communication should take place.

Turning to FIG. 1, a schematic block diagram of a system 10 that can implement mobility fingerprinting is depicted. The system 10 includes a mobile unit 12, a first radio system 14 and a second radio system 16. Typically the system 10 can include a plurality of mobile units. Each of the first radio system 14 and second radio system 16 employs a different radio technology. The mobile unit 12 includes circuitry configured to interface with at least the radio technologies implemented by the first and second radio systems. The mobile unit 12 may be configured to communicate using any number of radio technologies in addition to those of the depicted radio systems 14 and 16.

As one example, the first radio system 14 can employ a wireless network, such as WiFi or WIMAX. For instance, the first radio system 14 can include any number of access points that cooperate to form the wireless network. The second radio system 16 may operate using a cellular technology and thus include a plurality of cell base stations for communication over a corresponding coverage area.

The mobile unit 12 is portable and thus can be carried or otherwise transported in space, such as by a user, within the system 10. In the system 10, at least one predetermined location is pre-identified as a roam zone 18 where it has been ascertained that a handoff from a first radio technology to a second radio technology may need to occur. The roam zone 18 can be defined by a mobility fingerprint. The roam zone 18 can have dimensions in two-dimensional space or three-dimensional space depending upon the direction of travel of the mobile unit relative to the location. For example, a user can carry a mobile unit across the floor or ground as well as transport the mobile unit 12 between floors of a multi-floor building or dwelling.

One difficulty associated with a device that can operate according to multiple radio technologies is being able to determine when to transition from a first radio technology to a second radio technology such that the user does not detect a disturbance in the continuity of the communication. For example, when transitioning from communication over a wireless network (e.g., voice over internet protocol (VoIP)) to cellular, it may often take several seconds to setup the cellular call. This long call setup time means that any monitoring on the wireless network should assure that the call does not degrade beyond acceptable call quality before the cellular call is ready. Since the roam zones are established before handover is to occur (e.g., a priori), each roam zone can be established at a predetermined location to provide the mobile unit 12 with ample time to setup the call on the interface for the new radio technology before the signal on the old (pre-handover) radio technology degrades to an unusable level.

A variety of mechanisms can be utilized to gather mobility fingerprint data to identify each of the one or more roam zones 18 in the system 10. Examples of data that can be collected to provide a mobility fingerprint for a given roam zone 18 include: received signal strength indicator (RSSI) measurements, transmit power of detected transmitters, physical coordinates of measurements, the identity of transceivers from which signals are detected. Additionally, beacons or other forms of signaling (e.g., RFID tags) can be provided at a desired roam zone 18 in conjunction with other signals in the system 10 to provide the mobility fingerprints for respective roam zones. Alternatively, the beacons or other signaling (individually or in any combination thereof) can be provided at the roam zones to establish mobility fingerprints. The one or more signals utilized to define the mobility fingerprint for the each roam zone 18 can be a wireless signal propagating according to the first radio technology (e.g., utilized by the first radio system 14), the second radio technology (e.g., utilized by the second radio system 16), another radio technology with which the mobile unit 12 can interface, or one or more signals according to any combination of radio technologies. The particular types of information and signals utilized to provide the mobility fingerprint can vary for a given location according to the type of radio technologies and the technologies supported by the mobile unit 12, for example.

A trigger signal can be generated in response to detecting that the mobile unit 12 resides in the predetermined roam zone 18. The trigger signal can be utilized to initiate a handoff event by higher level control functions implemented within the system 10. The higher level control may evaluate other conditions associated with the communication and resources to determine whether the handover event should occur. The detection that the mobile unit resides within the roam zone 18 can be performed by the mobile unit 12, by the first radio system 14, by the second radio system 16, or by a combination of the mobile unit and the first and second radio systems.

In the example where the determination that the mobile unit resides within the roam zone is performed at the mobile unit, fingerprint data can be stored in memory of the mobile unit. Alternatively, the mobility fingerprint data can be stored in management software associated with the first radio system, the second radio system or for each of the first and second radio systems. As a further example, depending upon memory storage capabilities of the mobile unit, mobility fingerprint data can be loaded into memory of the mobile unit 12, such as in response to detecting that the mobile unit has entered a bounded area. The bounded area can be defined as including any number of one or more base stations or access points, such as may be associated with a floor, building or campus, or another physical structure or defined area that may provide wireless coverage according to a given radio technology.

By way of further example, one or both of the first radio system 14 and the second radio system 16 may include any number of one or more such bounded areas spaced apart from each other to define an enterprise. The bounded area can include a boundary, which may be a physical boundary, an RF boundary or a combination thereof. The same or different algorithms can be employed for the respective bounded areas for the radio systems 14 and 16 to detect whether a mobile unit resides in one of the predetermined roam zones 18. The differences in the algorithms may vary based upon the radio technology as well as based on the type of mobile unit 12 as well as other parameters that may be utilized to establish the predetermined roam zones. Advantageously, each of the predetermined roam zones can be established for predetermined locations as to maintain adequate signal strength to allow sufficient time to enable the call to be set up on the second radio technology before the current connection on the first radio technology becomes unusable.

Figure 2:
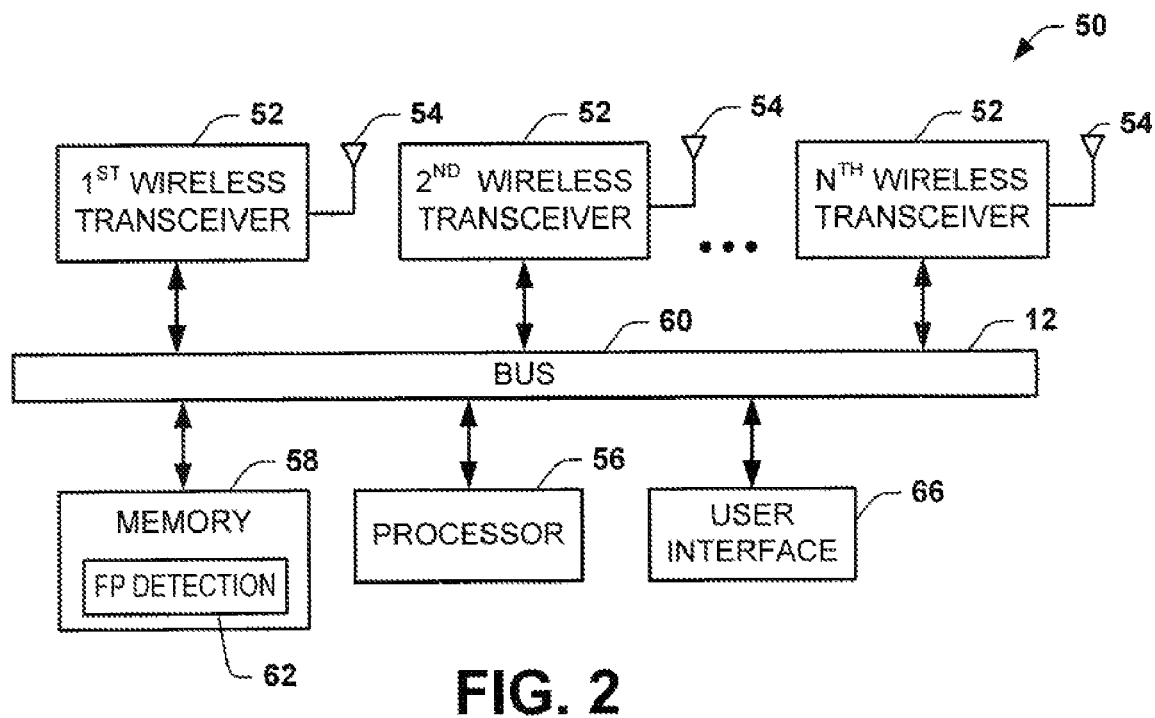
FIG. 2 depicts an example of a mobile unit that can be implemented according to an aspect of the invention.

FIG. 2 depicts an example of a mobile unit 50 that can be implemented according to an aspect of the invention. The mobile unit 50 is a wireless device that includes at least two wireless transceivers 52, indicated as first, second and Nth wireless transceiver, where N is a positive integer denoting the number of wireless transceivers. Each of the wireless transceivers 52 is operative to send and receive wireless signals via corresponding antennas 54. For receiving signals, each wireless transceiver 52 includes circuitry for demodulating and converting the received signals to an appropriate digital format for processing at the receiver as is known in the art. Each transceiver 52 may also include circuitry for converting data being provided from the mobile unit and from modulating and performing frequency conversion of such data and for sending such data out via the antenna 54.

The mobile unit 50 also includes a processor 56 that is programmed and configured to control operation of the mobile unit based upon executable instructions stored in associated memory 58. The memory can include random access memory (RAM), read only memory (ROM), flash memory, or other type of memory device. The processor 56 can communicate with each of the transceivers 52 via a bus 60. The processor 56 can also retrieve and store data and instructions relative to the memory 58 over the bus. Alternatively or additionally, the processor 56 may include cache or access other associated memory (not shown) directly. The mobile unit 50 may also include a user interface 64 that can be employed by a user for interacting with the mobile unit 50. The user interface 64 can include an arrangement of graphical interface elements as well as buttons and other controls (e.g., knobs, dials and touch screen controls and the like) for implementing the various functions of the mobile unit 50.

According to one embodiment, the processor 56 can execute instructions, corresponding to a fingerprint detection algorithm 62, for detecting that the mobile unit 50 resides within a predetermined roam zone. For example, the detection algorithm 62 can enable an evaluation of one or more signals relative to predefined fingerprint data (e.g., also stored in the memory 58) associated with the one or more roam zones to ascertain whether the mobile unit resides within a roam zone. In response to detecting that the mobile unit resides in a roam zone, a trigger signal can be generated for initiating handover from a first radio technology in which the mobile unit is currently operating to a second, different radio technology.

Figure 3:
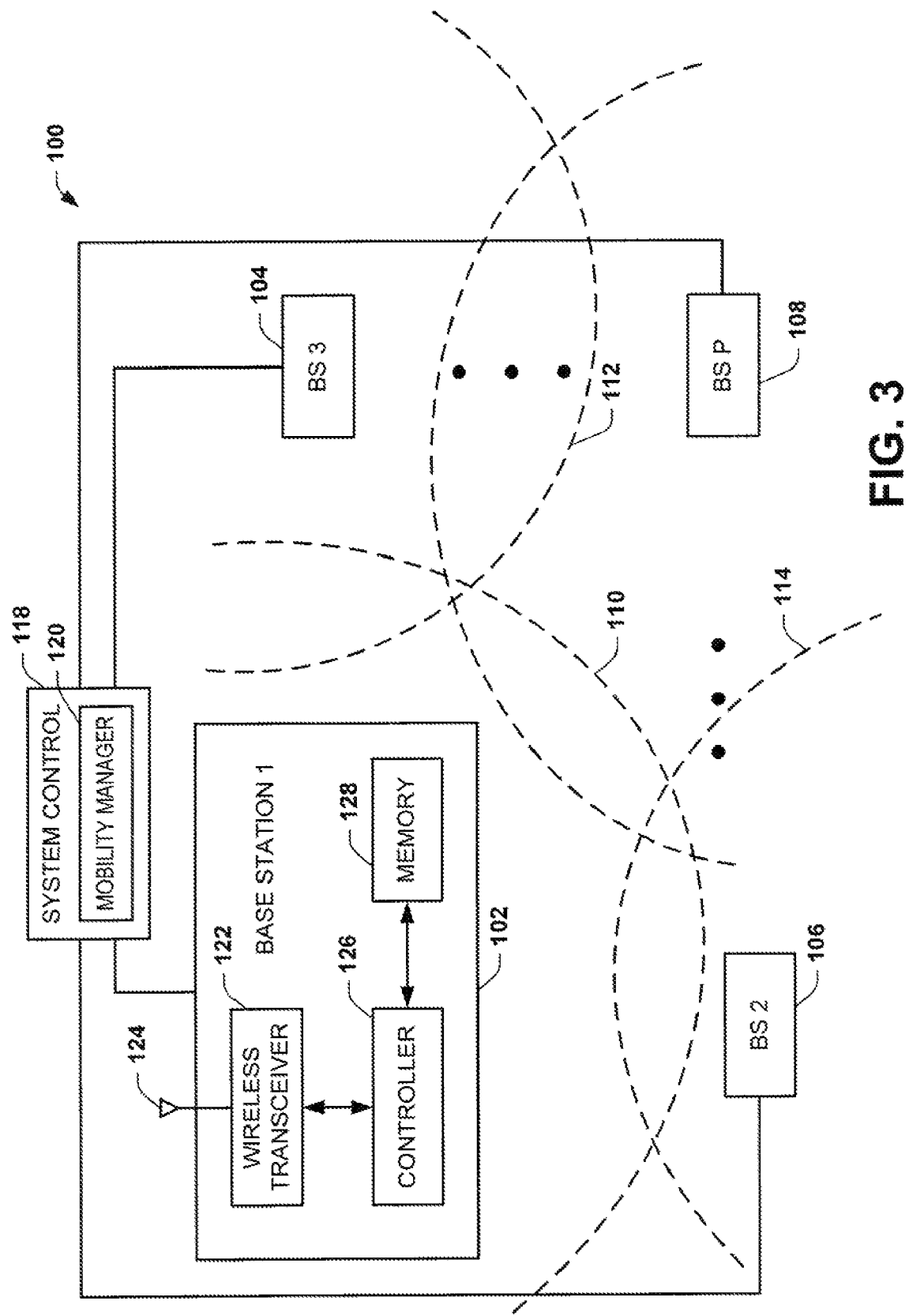
FIG. 3 depicts an example of a radio system that can be implemented in accordance with an aspect of the invention.

FIG. 3 depicts a schematic block diagram of a radio system 100 that operates according to a given radio technology. For the example of FIG. 3, the radio system 100 is intended to provide an overview for any radio technology that can be implemented including, for example, cellular and wireless networks (e.g., WiFi, WIMAX) to name a few. The system 100 includes a plurality of base stations, indicated at base station 1 (BS1), BS2, BS3 through BSP, where P is a positive integer indicating the number of base stations in the system 100 or a portion of the system. For instance, for a cellular network, each of the base stations 102, 104, 106 and 108 may correspond to a cellular base station. For the example of a wireless local area network (WLAN), each of the base stations 102, 104, 106 and 108 may correspond to an access point. That is, the term base station is not intended to denote any particular radio technology, but is intended as a generic term that can be utilized to implement a given radio technology for a geographical area.

Each of the base stations 102, 104, 106 and 108 includes a coverage area indicated schematically at dashed lines 110, 112, 114 and 116, respectively. Depending upon the type of radio technology, each of the base stations can be positioned strategically according to a plan to provide a substantially continuous coverage according to the overlapping coverage areas 110, 112, 114, and 116 provided by the respective base stations. Each of the base stations 102, 104 and 106 and 108 can be connected to each other such as over a network (e.g., a local or wide area network or the public telephone switch network) to coordinate operation between the respective base stations.

The system 100 can also include a system control 118 that is programmed and/or configured to control operation and manage resources in the system 100. For example the system control 118 can include a mobility manage 120 that is utilized to control higher level functions associated with handover events for a mobile unit between the respective base stations as well as to control handover from the radio technology implemented by the system 100 to a different radio technology in which the mobile unit may operate. For example, the mobility manager 120 may condition the handover event on a variety of factors, such as capacity of the respective networks, available connection quality, estimate battery life of the mobile unit, the type of call. Additionally or alternatively, the mobility manager 120 may also apply a cost algorithm to determine which radio technology would provide the lowest cost for handling the call. Those skilled in the art will appreciate other factors that may be evaluated to determine whether to complete the handoff.

The base station 102 is depicted as including at least one wireless transceiver 122 that is operable to send and receive wireless signals within its coverage area. The wireless transceiver 122 thus includes appropriate circuitry for sending and receiving signals via its one or more antennas 124. The base station 102 also includes a controller 126 that is coupled to the wireless transceiver 522. The controller 126 controls the operation of the transceiver 122. The controller 126 can include appropriate hardware and software that is programmed and/or configured to perform the functions associated with the base stations. The executable instructions can be stored in memory 128, which can be part of the controller or separate memory from the controller.

In one embodiment, one or more of the respective base stations 102, 104, 106 and 108 can be programmed to detect that a mobile unit resides in a predetermined roam zone. The determination can be made based on signals received from the mobile unit at the respective base stations as well as from a combination of signals from neighboring base stations, based on which signals a determination can be made that the mobile unit resides in the roam zone. A base station can also include additional transceivers or receivers that can receive one or more signals, in the same or a different radio technology, which can be utilized to determine if the mobile unit resides within the predetermined roam zone. In response to determining that the mobile unit resides within the roam zone, a trigger signal can be generated. For instance, the trigger signal can be generated by a base station or by the mobility manager 120 in the system 100. The trigger signal can in turn be utilized to initiate a handover event. The handover event further can take into consideration a variety of other factors in the system 100 as well as those associated with the mobile unit to determine whether to complete the handover from the radio technology of the system 100 to a different radio technology.

In accordance with another embodiment, the system 100 may be programmed to send fingerprint data to a mobile unit. For example, in response to detecting that the mobile unit has entered a coverage area provided by the system 100, the base station to which the mobile unit is connected can send a set of fingerprint data to enable detection of a mobility fingerprint for a selected portion or for the entire bounded area in which coverage is provided by the system 100. Additionally, since it is possible that fingerprint data may vary over time, updated fingerprint data may be transmitted to or from one or more of the base stations 102, 104, 106 and 108 so that current fingerprint data can be maintained within the system 100.

Various embodiments for gathering fingerprint data will be better appreciated with reference to the examples of FIGS. 4-8. In the examples of FIGS. 4-8, it is assumed that the systems implement at least two different radio technologies, such as including cellular (e.g., 3G or higher) and a wireless network (e.g., WiFi or WiMax). Thus, the base stations in the examples of FIGS. 4-8 are referred to as access points, although it will be appreciated that base stations could be other types of devices. Additionally, while the examples of FIGS. 4-8 primarily describe the use of fingerprinting from the client side, the techniques described herein apply equally as well to the network side (e.g., 802.11 Access Points).

Figure 4:
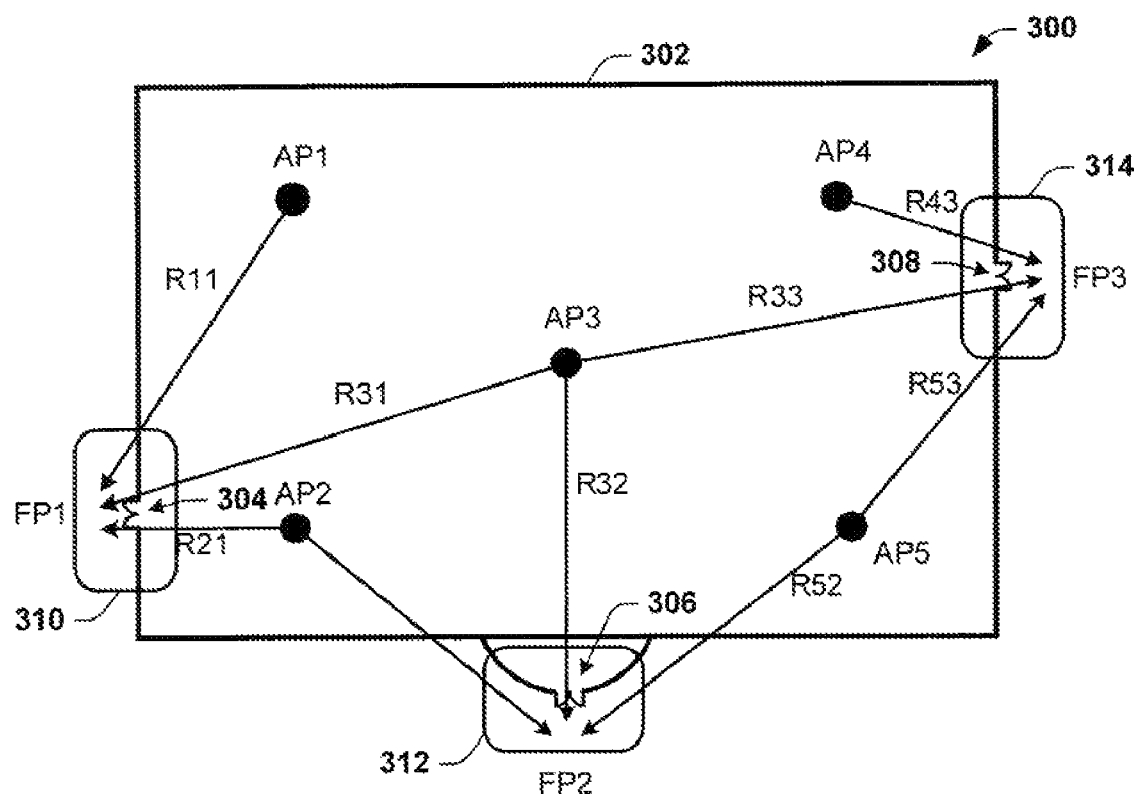
FIG. 4 depicts an example of a wireless network implementing mobility fingerprinting in accordance with an aspect of the invention.

FIG. 4 depicts an example of a wireless network 300 associated with a given area (e.g., a floor or building, a campus or other area) 302. The wireless network 300 includes a plurality of access points AP1, AP2, AP3, AP4 and AP5 to provide coverage within or around the structure according to a given radio technology (e.g., WiFi or WiMax). The area 302 can include one or more points of entry or egress, indicated at 304, 306 and 308 through which mobile units may pass. It is associated with one or more of these points of entry or egress 304, 306 and 308 that respective roam zones 310, 312 and 314 can be established. In particular, a mobility fingerprint for the point of egress 304, indicated at FP1, can be defined for each of the roam zone 310 to facilitate handover according to an aspect of the invention. Mobility fingerprints FP2 and FP3 can also be determined for roam zones 312 and 314, respectively, associated with points of egress 306 and 308.

In the example, of FIG. 4, FP1 can be defined as a function of RSSI vectors R11, R31 and R21. For example, R11 is the RSSI vector from AP1 to the roam zone 310, R31 is the RSSI vector from AP3 to roam zone 310, and R21 is the RSSI vector from AP2 to roam zone 310. Similar mobility fingerprints FP2 and FP3 can be established as including RSSI vectors for each of the other roam zones 312 and 314, respectively, as depicted in FIG. 4. Those skilled in the art will understand and appreciate various approaches that can be utilized to gather data for generating mobility fingerprints. For example, the fingerprint data gathering can be performed by fingerprint calibration data collection, adaptive fingerprint data collection, predicted fingerprint data collection or by any combination of two or more such approaches.

For fingerprint calibration data collection, the RSSI vectors can include raw data manually collected during calibration by circuitry of a mobile device that can operate according to the radio technology of the wireless network 300. The mobility fingerprint for a given roam zone further may be calculated based on the raw collected data (e.g., RSSI measurements) as well as the additional information that can be gathered during calibration. For example, the calibration phase can also collect transmit power of the detected APs, physical coordinates of the measurement locations, and the RSSI and identify of one or more cellular base stations that provide coverage in the area in which the roam zones 310, 312 and 314 are located. The physical coordinates can be generated by the network 300 or another system, such as a GPS.

As an alternative to employing RSSI measurements to provide fingerprint data, the approach described herein supports using path loss as a metric. The path loss from a given AP is independent of the transmit power, but requires that the transmit power of the AP be known. By knowing the transmit power of the AP, all triangulation calculations can be made by converting a received signal strength into a corresponding path loss value.

There are several ways that the transmit power may be determined. For example, in a WLAN, tools of the WLAN management system may be accessed to obtain an indication of the transmit power. Where the mobile unit operates as a wireless client in WLAN, those skilled in the art will understand that various services can interface with the WLAN management system to support intra-network roaming as the mobile unit roams within the coverage area(s) supported by the WLAN. For instance, a Roam Anywhere (RA) server running within the WLAN can support such roaming as well as be programmed to access a WLAN management system and gather data that describes the current transmit power settings of the APs. Additionally, any subsequent changes in power can be detected by the RA server for providing an updated indication of the transmit power. With this transmit power data any signal measurement from the client may be easily converted into a path loss. One example of a WLAN management system that could provide such information is the Wireless LAN Solution Engine (WLSE) available from Cisco Systems, Inc. of San Jose, Calif. The WLSE provides a programmatic SOAP XML interface that would allow the RA Server (or other service) to access the desired transmit power information.

Additionally or alternatively, there are various information elements in the 802.11 Beacon or probe response frames provided by an access point. These information elements can be evaluated to provide an indication of transmit power for an access point. For example, the Compatibility Extensions (CCX) program, which is available from Cisco Systems, Inc., provides elements that indicate the AP's current transmit power. Additionally, the IEEE is developing standards for doing the very same. These additions to the standard can be found in the current TGk draft. Those skilled in the art may understand and appreciate other methods that can be employed to provide an indication of transmit power for various types of wireless transmitters, which can be leveraged to determine path loss value.

Figure 5:
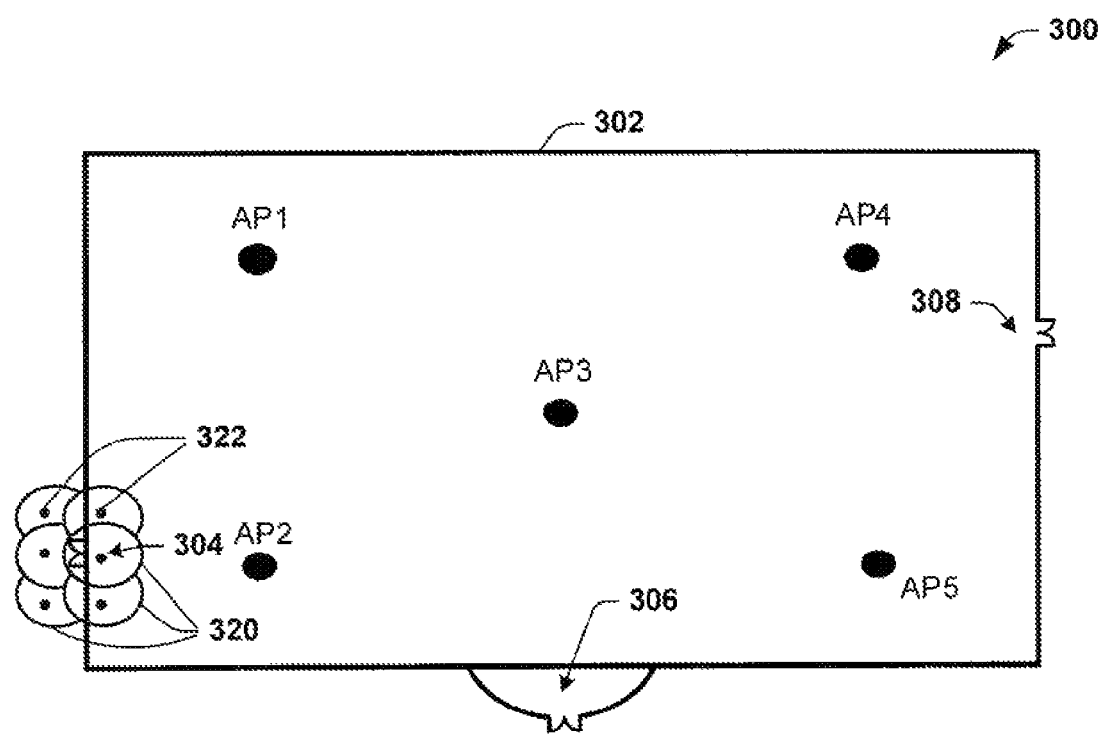
FIG. 5 depicts an example of a floor plan for part of a wireless network demonstrating calibration that can be utilized to establish a mobility fingerprint for a roam zone in accordance with an aspect of the invention.

FIG. 5 demonstrates an example of some calibration data that may be gathered near roam zone 310 for FP1 for the wireless network 300 shown and described in FIG. 4. As an example, several data points are gathered for a plurality of respective locations 320 adjacent the egress point 304, which may reside both inside and outside the area (e.g., building) 302. This data represents the raw data collected by a mobile unit 322, such as a reference data collection device, which can operates as a client within the wireless network 300. For example, a data collection device (e.g., a mobile unit) 322 can be positioned at each of the data collection locations 320 and a plurality of samples obtained for each point. This raw collected data can be processed into a mobility fingerprint (e.g., FP1 of FIG. 4).

By way of example, the mobility fingerprint calibration data may be collected and stored locally on the collection device and then transmitted to a management server (e.g., a roam anywhere (RA) server) for processing into a corresponding mobility fingerprint. Alternatively, the collected data can be transmitted in real time to the roam anywhere (RA) server. As yet another alternative, a portion or all such processing may be performed locally by the data collection device. A strategic consideration is to not lose any of the collected data regardless of whether the device is connected to the wireless network 300, as such data can enhance the resulting mobility fingerprint. Another consideration during the gathering of the calibration data is to ensure the APs used for the fingerprint generation belong to the desired wireless network 300 and not a rogue or neighboring network. Using signals from other AP's, such as rogues or neighboring APs, may result in inaccuracies. The filtering of extraneous APs and associated raw data can be done at any point, such as during the collection of the data or while the data is being processed for generating the mobility fingerprint.

Fingerprint calibration data collection generally requires that an administrator or other person physically gather the data for the roaming zones. However, it is possible that the administrator may not know where all the roaming zones are in a given building. For example, there can be areas in the wireless network that are not exit points but do demonstrate weak or unusable wireless connectivity for communication purposes. In this case, without mobility fingerprint data for such locations, the roaming algorithm would need to fall back to simple signal strength and quality mechanisms for roaming such as described herein.

Adaptive fingerprint data collection provides a substantially automatic approach that can be utilized to gather fingerprint data. Adaptive fingerprint collection is a mechanism where the mobile unit in the wireless network 300 derives fingerprint data as a result of its normal operation. In this situation the gathered data can be the same data that is gathered during calibration, except that it is unlikely that the client will have physical coordinates. However, those skilled in the art will appreciate that approaches exist and may be developed in the future to enable an accurate determination of the mobile unit's location, such as through new additions in the standards related to location. For example, in the IEEE, the TGv task group has defined mechanisms that allow a client to periodically generate its own location or receive its location from the WLAN. Additionally or alternative, other methods, such as GPS or assisted GPS techniques, can be employed to generate location information.

Some of the methods that can be used to adaptively gather fingerprint data include Post RF failure scanning data examination (time based) and initial WLAN access scanning data examination. By way of example, when the mobile client is in an active session within a WLAN, such as a voice, call data will be collected for the purpose of searching for fingerprint match. Some amount of the past collected data (e.g., about 5 to about 10 seconds worth of data) can be saved in memory of the mobile client during this time. When either a session failure occurs or a roam due to minimum signal strength occurs fee past data can be examined. It has been determined that the data collected within the last 5 to 10 seconds likely contains data that identifies the zone where a handoff should be initiated. The stored data can be transmitted to a roam anywhere (RA) server or other service for processing. Similar data can be collected by a plurality of mobile units operating in the wireless network, which data can be aggregated and processed to generate the mobility fingerprint for each identified roam zone. Other techniques can be utilized to determine a common point of egress for a facility or building. For instance, data collected from multiple mobile devices can be examined to identify a common location where such devices exhibit substantially the same handover event according to a minimum signal strength criterion. The set of measurement data associated with the handover events can be utilized to define a mobility fingerprint for the common point of egress. This common set of measurements should exist for the mobile unit regardless of the direction of travel after exiting the building.

Another method of collecting adaptive data is to examine scanning date collected by mobile units upon initial association with a wireless network. By tracking the time when the wireless network first becomes visible to the wireless adapter of the mobile unit, it is possible to identify the mobility fingerprint at this location. It should be noted that the fingerprint data collection method may require some amount of speculation as to where the client is at the time of this normal wireless event. To improve the accuracy of this approach, the data collected in connection with such initial association by the mobile units can be collected over an extended period of time before using such collected data to generate a corresponding mobility fingerprint. For example, if the RA server can determine that several clients are seeing similar data at the same RF locations then the data can be deemed statistically significant and, therefore, processed into a mobility fingerprint for such locations.

The predicted fingerprint data collection approach lies somewhere in between the former two methods of calibration and adaptive fingerprint data collection. There are several tools available today mat can be used to predict WLAN coverage. Some examples of these tools include: the Wireless LAN Solution Engine (WLSE) available from Cisco Systems, Inc. of San Jose, Calif.; the Wireless LAN Control System (WLC) available from Cisco Systems, Inc.; the Surveyor tool from AirMagnet, Inc. of Sunnyvale, Calif.; and the Wireless Valley software planning tool available from Motorola, Inc.

For the predicted fingerprint data collection method, the RA server imports signal strength information from one or more tools that support WLAN coverage prediction. An administrator can then identify the targeted roaming zones and the mobility fingerprint data would be generated for those identified locations. Once again the generated data can be substantially same as mentioned above with respect to the calibration data collection method. For instance, a main portion of the predicted data acquired from such tools is the expected RSSI to each AP. For the particular example of the Surveyor tool from AirMagnet Inc., it is possible for the RA server to utilize the surveyed data directly. AirMagnet Surveyor tool requires a user to walk around and collect data for the purpose of predicting coverage. This data is in the format of a file with measured RSSI and other information. It is possible that this file may be directly imported by the RA server or other processing device to generate fingerprint data for one or more roaming zones.

Regardless of the method or methods utilized to collect data, the collected data can be processed to generate a mobility fingerprint for each identified roaming zone. Those skilled in the art will understand and appreciate various ways that the collected data can be used to generate fingerprint data. Referring back to FIG. 4, one approach is triangulation of a static fingerprint based on the collected data. Static Fingerprinting operates on the concept of defining one physical area by a range of signal strength values seen from multiple transmitters. The size of the area can be defined by the overall allowed signal strength range from each of the transmitters. Static Fingerprint FP1 can be located by the evaluating of RSSI vectors R11, R21 and R31. It is possible to identify this specific location by finding the cross section of the signal received from each of the APs detected at the location.

Figure 6:
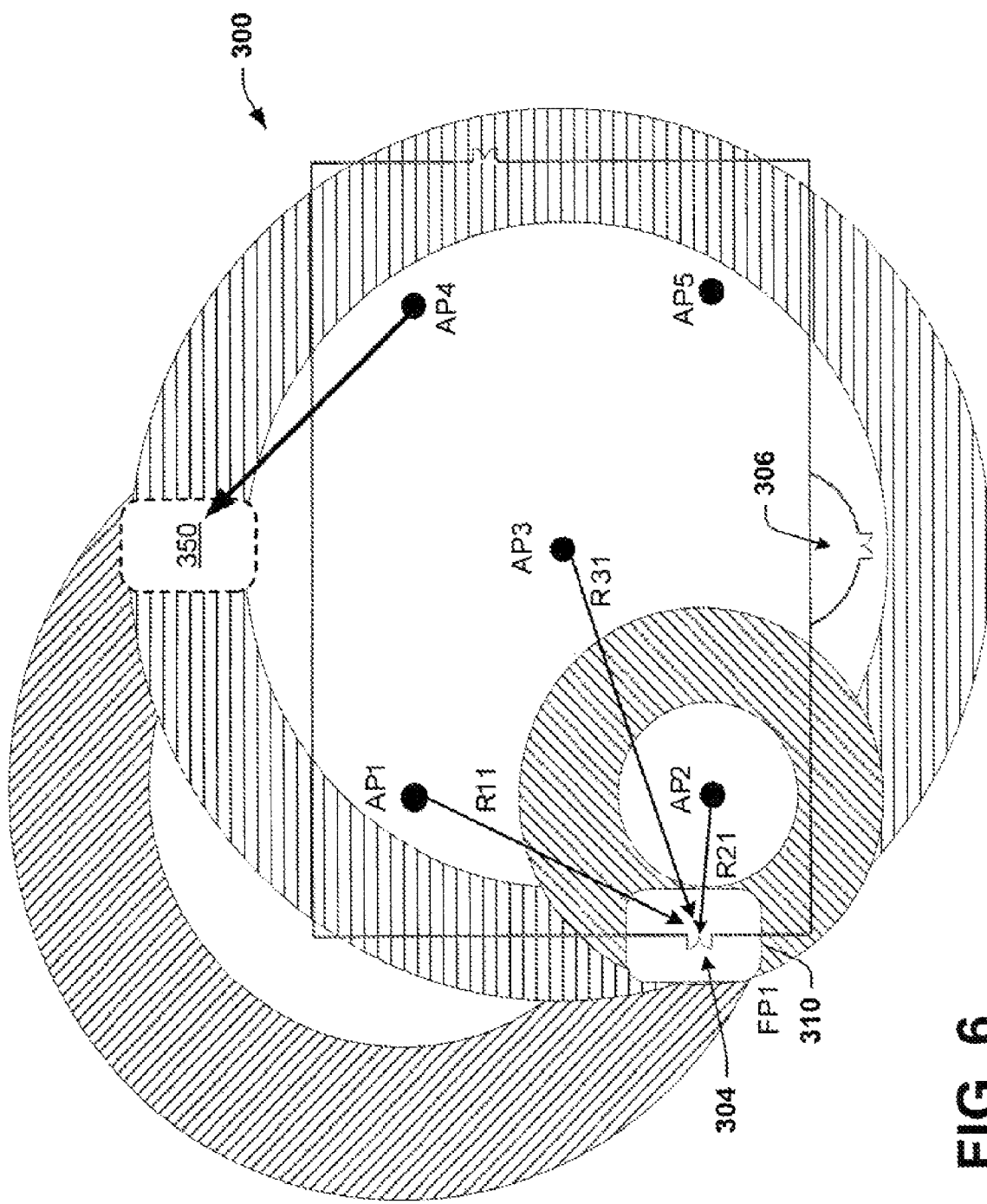
FIG. 6 depicts an example of a technique that can be utilized to establish a static mobility fingerprint for a roam zone in accordance with an aspect of the invention.

FIG. 6 demonstrates an example of how FP1 associated with the roam zone 310 can be identified. In the example of FIG. 6, FP1 can be determined by finding the cross section where signal strength values R11, R21 and R31 intersect. It will be appreciated that, in practice, the signals from the radios will not radiate uniformly (due to antennas, reflections, walls, interference, etc.) as shown in the example of FIG. 6; however, the concept being applied can work in practical scenarios.

By way of further example, Table 1 lists some example data that can be used to define FP1 for the roaming zone 310 in the example of FIG. 6. In Table 1, the RSSI values are ordered in order from strongest to weakest, namely in descending order AP2, AP1 and AP3. One of the identifying factors of a static fingerprint can be the strength of the signal received from the APs. For example, the RSSI vector having the highest RSSI value can be considered a primary identifier for the fingerprint with the other RSSI vectors being secondary identifiers. The RSSI Variance in Table 1 indicates the allowed range of signal strength that defines the size of the roaming zone 310 for each AP.

TABLE 1

| AP | BSSID | RSSI | RSSI Variance |
|---|---|---|---|
| AP2 | 00:11:22:33:44:02 | −52 dBm | 3 dB |
| AP1 | 00:11:22:33:44:01 | −73 dBm | 3 dB |
| AP3 | 00:11:22:33:44:03 | −82 dBm | 4 dB |

As described above, a mobility fingerprint can be generated based on signal characteristics from signals transmitted according to more than one type of radio technology. Signal characteristics can include attributes or properties, such as can be measured or calculated from the received signal, information carried by the signal as well a combination of attributes or properties and information. Thus, while it is possible to generate static fingerprints that include only signal generated in one type of radio technology (e.g., WiFi radio signals in a WLAN), static fingerprints can also include information from other radio technologies.

Figure 7:
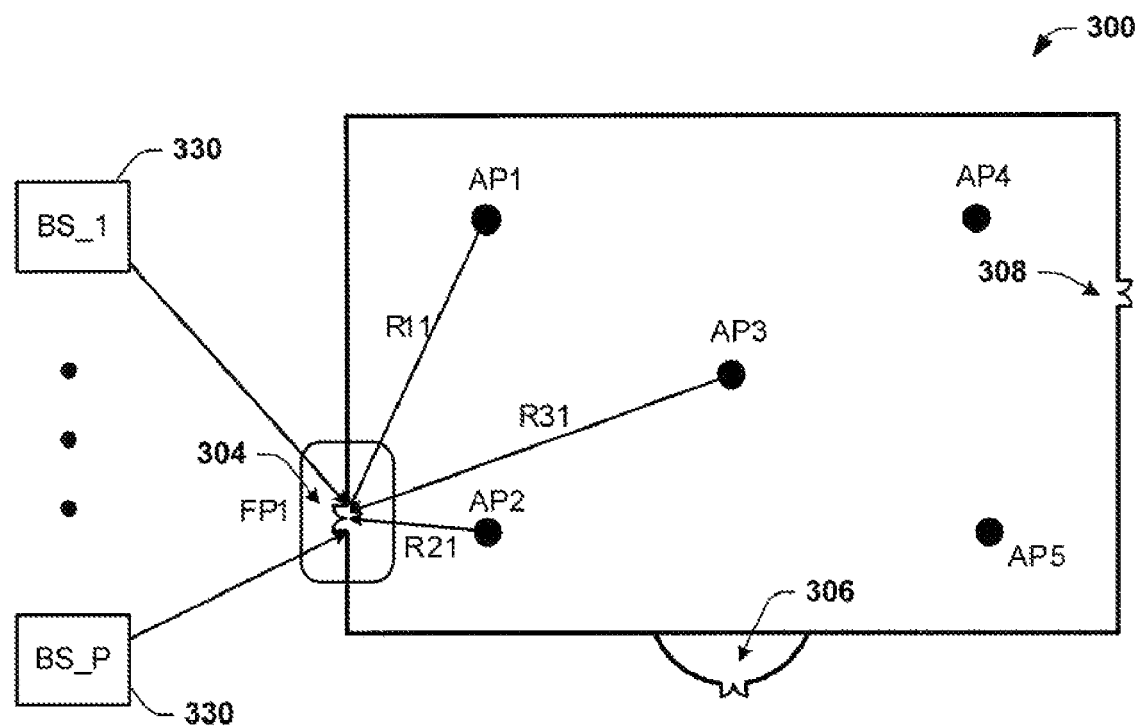
FIG. 7 depicts an example of a system in which a mobility fingerprint is defined by information from different radio technologies.

By way of example, FIG. 7 expands on the static fingerprint FP1 to include information relating to signals from multiple radio technologies. In FIG. 7, the communication system 300 can also include one or more base stations 330, indicated at BS_I through BS_P, where P is a positive integer denoting the number of base stations with which a mobile unit may be able to connect at the roaming zone 310. The base stations 330, for example, can correspond to cellular base stations, satellites, two-radio routers and the like. For purpose of brevity, the base stations in FIG. 7 are assumed to be cellular base stations that provide cellular information. A given location is often covered by one or more cellular base station.

The static fingerprint FP1 might be captured for predetermined location 304 to that include both WiFi radio information and cellular tower information. For the example of a global system for mobile (GSM) cellular network, the following information may be captured: Mobile Country Code (MCC); Mobile Network Code (MNC); Location Area Code (LAC); Cell Id; and Received Signal Strength Indicator (RSSI). By way of further example, Table 2 demonstrates an example of data that can be measured in the predetermined location for generating a static fingerprint FP1 that includes both WiFi and cellular data.

TABLE 2

| AP | BSSID | RSSI | RSSI Variance | |
|---|---|---|---|---|
| AP2 | 00:11:22:33:44:02 | −52 dBm | 3 dB | |
| AP1 | 00:11:22:33:44:01 | −73 dBm | 3 dB | |
| AP3 | 00:11:22:33:44:03 | −82 dBm | 4 dB | |
| CELL ID | MCC | MNC | LAC | RSSI |
| 12385 | 310 | 38 | 6096 | −65 dBm |
| 12379 | 310 | 38 | 6096 | −82 dBm |

Another approach that can be employed to generate a mobility fingerprint relates to vector mobility fingerprinting. Vector mobility fingerprinting builds on the concept of the static fingerprint by combining several static fingerprints together. As a result, a vector fingerprint can provide an indication of direction of movement within a location. Since vector fingerprinting provides an additional movement component, vector fingerprinting can operate as a discriminator to help reduce false fingerprint detections or missed detections.

Figure 8:
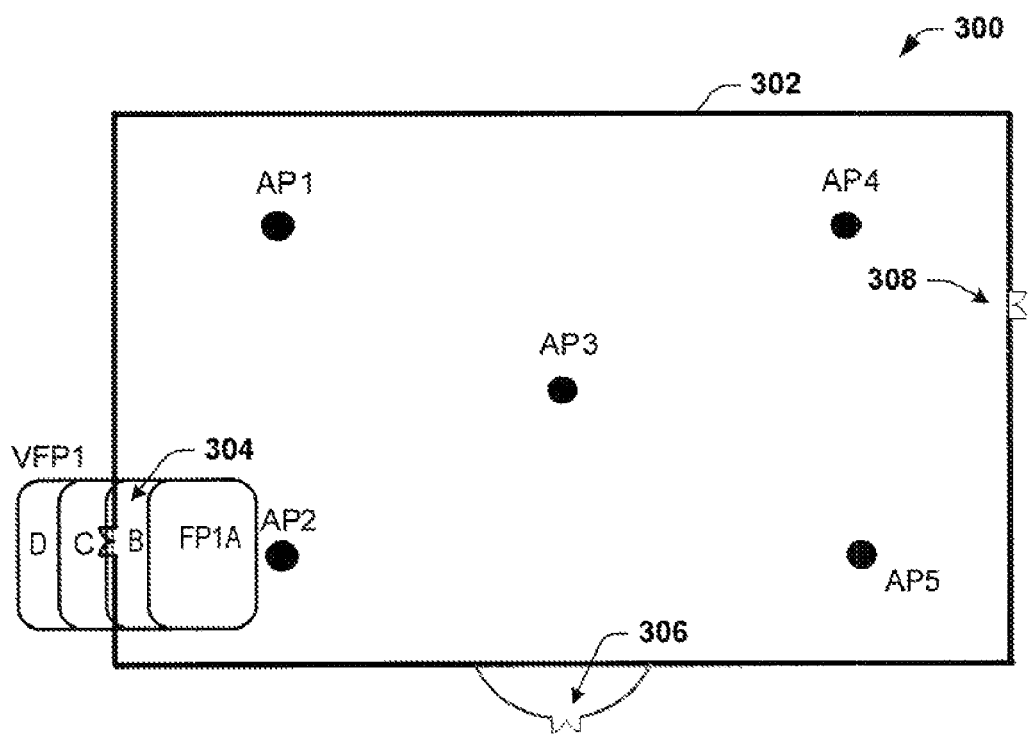
FIG. 8 depicts an example of a vector fingerprint that can be determined for a roam zone according to an aspect of the invention.

By way of example, FIG. 8 demonstrates an example of a vector fingerprint VFP1 that includes a combination of four static fingerprints FP1A, FP1B, FP1C and FP1D associated with the egress 304 of egress point 304 in the wireless network 300. Each static fingerprint may include signal characteristics from the same set of APs (e.g., AP1, AP2 and AP3) or the static fingerprints can include one or more different APs. In addition to the signals from APs, signals from other radio technologies can also be utilized to form the static fingerprints that combine to define the vector fingerprint VFP1, such as described herein.

Table 3 lists an example of sample values that might be included in a vector fingerprint VFP1 of FIG. 8. By evaluating the changing RSSI values it is possible to determine that the direction of motion is towards the roaming zone.

TABLE 3

| VFP | AP | BSSID | RSSI | RSSI Variance |
|---|---|---|---|---|
| 1 | AP2 | 00:11:22:33:44:02 | −50 dBm | 3 dB |
|   | AP1 | 00:11:22:33:44:01 | −72 dBm | 3 dB |
|   | AP3 | 00:11:22:33:44:03 | −82 dBm | 4 dB |
| 2 | AP2 | 00:11:22:33:44:02 | −52 dBm | 3 dB |
|   | AP1 | 00:11:22:33:44:01 | −73 dBm | 3 dB |
|   | AP3 | 00:11:22:33:44:03 | −82 dBm | 4 dB |
| 3 | AP2 | 00:11:22:33:44:02 | −54 dBm | 3 dB |
|   | AP1 | 00:11:22:33:44:01 | −74 dBm | 3 dB |
|   | AP3 | 00:11:22:33:44:03 | −82 dBm | 4 dB |
| 4 | AP2 | 00:11:22:33:44:02 | −56 dBm | 3 dB |
|   | AP1 | 00:11:22:33:44:01 | −75 dBm | 3 dB |
|   | AP3 | 00:11:22:33:44:03 | −82 dBm | 4 dB |

There may be situations where certain mobility fingerprint methods can yield false positive results. A false positive result can occur when a roaming zone is falsely detected such that is causes an unwanted move from the current network to the next network. For example, a false positive result can be the result of inaccurate measurements, environmental changes affecting the measurements, or incomplete measurements. One way to mitigate false positives is to add one or more additional discriminators to the fingerprint detection algorithm. As used herein, a discriminator corresponds to an additional condition or criteria having a value that can prevent a fingerprint from becoming a positive match. A discriminator thus can nullify an otherwise positive fingerprint match if the discriminator has a predetermined value (or is within a predefined range of values).

As one example, one or more exclusion areas can be created to operate as discriminators. An exclusion area can be detected by examining the complete set of signals received in a measurement. If a signal is received front an AP that is not in the fingerprint set or has a signal strength that is significantly different than what is expected for the fingerprint, then the area defined by the measurement can be considered excluded. Referring back to FIG. 6, an area or region 350 is shown that could cause a possible false positive match, such as for the fingerprint FP1 associated with the egress 304. In this case, if scanning for a mobile unit within the network 300 produces a measurement set that only includes valid signals for AP1, AP3 and AP4 then a false positive could occur. For this situation to occur, however, the fingerprint algorithm would need to be configured to support mobility fingerprint detection with partial matches. In this case, by evaluating the inclusion of the AP4 RSSI vector we can conclude that this is not a fingerprint match for FP1. Similar exclusion conditions can be established for other mobility fingerprints. As one example, data that defines exclusion areas can be provided with the fingerprint data in a fingerprint data set.

As another example, if a mobility fingerprint includes radio information from a different radio technology than the current connection (see, e.g., FIG. 7), it is possible to use the different radio technology information as a discriminator. Assuming a mobile unit is currently connected with a WiFi wireless network 300, for example, cellular tower information, WiMax information, Bluetooth information, an RFID tag or another radio technology can operate (individually or collectively) as a discriminator. Once a match has been made using the WiFi radio information, for example, the cellular tower information may be used to confirm the overall fingerprint match as being a valid match.

By way of further example, the cellular tower information can be used as a discriminator in one or more ways. A radio tower can be detected by matching one or more radio tower identifiers, such as MCC, MNC, LAC, and/or Cell Id. The tower information can be detected as a discriminator if the measured RSSI matches the RSSI value defined by the mobility fingerprint. Additionally or alternatively, the tower information might indicate that the measured RSSI is less than fingerprint RSSI or if the measured RSSI is stronger than fingerprint RSSI. It will be understood and appreciated that the particular application of the radio tower information may vary according to the fingerprint method being used.

Figure 9:
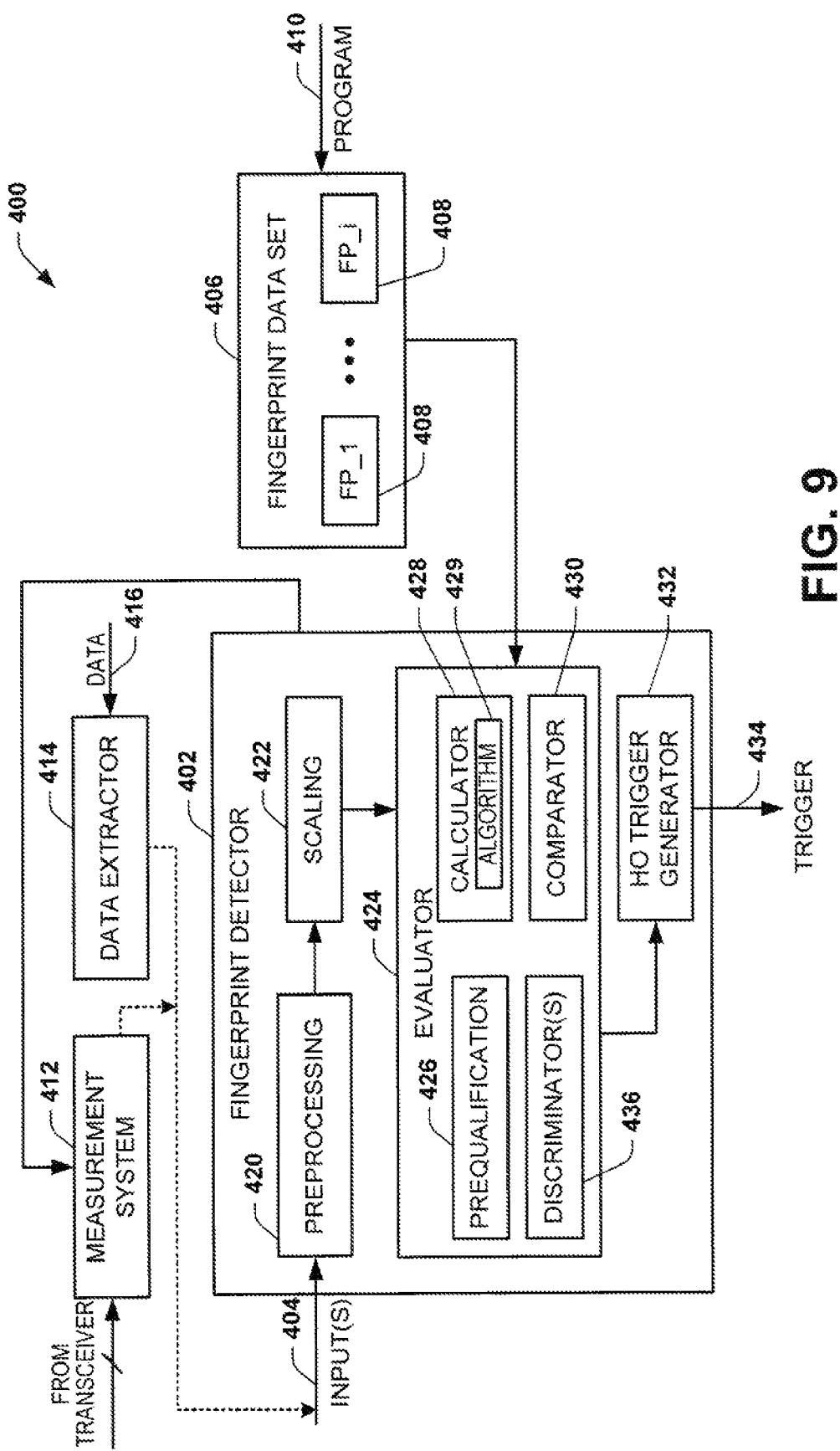
FIG. 9 depicts an example of a mobility fingerprint detection system that can be implemented according to an aspect of the invention.

FIG. 9 depicts an example of a system 400 that can be utilized to detect a mobility fingerprint according to an aspect of the invention. The system 400 includes a fingerprint detector 402 that is programmed and/or configured to determine if a mobile unit resides within a predetermined roam zone. The fingerprint detector 402 can be programmed with one or more fingerprint evaluation algorithms according to the type and content of the fingerprint data and based on where (what part of the system) the evaluation is performed. The mobility fingerprint detector 402 thus can determine a fingerprint match based on a set of one or more inputs 404 and a predetermined fingerprint data set 406 that includes fingerprint data 408. This particular type of input 404 can vary depending upon the type of signals and the sources of the signals that are utilized to generate the fingerprint data set 406. The fingerprint detector 402 processes the inputs at 404 and compares the processed results relative to the set of fingerprint data 406. The fingerprint detector 402 can be implemented in a mobile unit (e.g., a wireless client), a network infrastructure (such as a server associated with cellular base station or an access point), or may be distributed across a mobile unit and network.

In the example of FIG. 9, the set of fingerprint data includes fingerprint data 408, indicated at FP_1 and FP_i, where i is a positive integer (i≧1) denoting the number of mobility fingerprints represented by the fingerprint data set 406. As described herein, the fingerprint data set 406 can include fingerprint data 408 for a group of roam zones as such as may be associated with a bounded area or other desired location or group of locations. The fingerprint data set 406 can be programmed by a fingerprint program signal indicated at 410. Depending upon the type of radio technology and the types of signals utilized to generate the fingerprint data 408, the fingerprint data set may be fixed or it may be updated over time such is based on the program signal 410. Additionally, the program signal 410 can be provided to modify the fingerprint data 408 in the fingerprint data set such as to reflect changes in the roam zone. The changes to roam zone can include adding a new roam zone, believing in an existing roam zone or changing the fingerprint data associated with a given roam zone. The fingerprint data 408 thus can be provided to the fingerprint detector 402 for performing and identifying mobility fingerprints.

As described herein, the fingerprint detection system 400 can be implemented in a mobile unit. Due to the size of many enterprise systems, it would not be acceptable to configure the data for all locations on the mobile unit—the amount of data could prove to be excessive and possibly exhaust the memory on the device. Accordingly, roam zones can be organized into manageable groups or sets. The mobility fingerprint data set 406 associated with each roam zone in a given group can be distributed to the mobile unit in the form of the fingerprint data set 406 as needed.

For example, one possible grouping for enterprise customers is to segment the data into selected areas, such as campus, building, and floor. Each floor may contain multiple roam zones, typically at the points of entry and exit of the building. In any grouping, means are required to identify which fingerprint data set the mobile unit currently needs. This means can be in the form of key data provided by the mobile unit to the network, which can be evaluated by corresponding executable instructions. Alternatively, the key can be generated by the network based on a connection the mobile unit being connected to a particular portion or portions in the network. The type of key data can vary depending on the type of mobility fingerprints being employed. Examples of possible key data include Access Point BSSID, GSM Cell Id, and GSM Location Area Code (LAC) to name a few. Other identifiers or RF tags associated with a particular location can also be utilized as key data to identify a set of fingerprint data that is needed for the mobile unit.

As a further example, for an 802.11 wireless network, the key data can include the BSSID of one or more AP. In this case, the mobile unit can pass the BSSID of the AP to which it is currently connected to a higher level function (e.g., a mobility manager). The higher level function can cause the appropriate fingerprint data set to be loaded onto the mobile device based on the BSSID of the connected AP. As the mobile device moves from AP to AP it may receive a new data set based on the key data. If the data set has been segmented by floors, the mobile device can receive a new data set as it moves to each new floor in a building or possible as it moves to a new building. Those skilled in the art will understand and appreciate various ways to segment the data and corresponding keys that can be employed to load the appropriate fingerprint data sets.

As described herein, the one or more input 404 to the fingerprint detector 402 can include signal measurements by a device or devices implementing the system 400. By way of example, a measurement system 412 can receive one or more signals from a transceiver or from a plurality of different transceivers or receivers to provide measurements or other signal characteristics of the one or more received signals. For instance, the measurements may include a received signal strength (RSSI) measurements from a detected base station as well (e.g., on AP or a cell tower) as information identifying the detected base station. The base station can include an access point, such as for WiFi and WiMax wireless network as well as a cellular base station, for example, a data extractor 414 can be programmed and/or configured to extract predetermined data from a data signal 416.

The data signal 416 can be received over a wireless communication link after appropriate preprocessing and removal of the physical layer. For example, the data extractor 414 can extract predetermined information elements from the media access control (MAC) layer of an associated protocol stack over which information is being communicated. The information elements, for example, can include the transmit power associated with the detected base station (e.g., access point). The input 404 can also include physical location coordinates for where the measurements are taken. Those skilled in the art will understand and appreciate that the input 404 to the fingerprint detector 402 can include a variety of other information derived from one or more signals that can be received by or transmitted from a mobile unit. Examples of such other signals include GPS information, beacon signals (e.g., from a Bluetooth beacon located adjacent or at the roam zone) as well as other signal transmitters and transceivers that may be operating within the multimode wireless communication system.

The fingerprint detector 402 can include a preprocessing block 420 that is programmed and/or configured to implement preprocessing on the input 404. The preprocessing 420 can include filtering or extraction of extraneous data from the input 404 to enable appropriate processing of the relevant input data. For example, the preprocessing 420 can arrange the input data into an appropriate format (e.g., array, table, linked lists, or other data structures) to facilitate processing thereof.

When measurements are taken for the purpose of fingerprint evaluation it may be necessary to scale the measurements. The preprocessed data thus can be provided to a sealing component 422. The scaling component 422 can perform appropriate scaling to eliminate (or reduce) variations in the hardware and software used to make the measurements. That is, the scaling component 422 can scale signal characteristics or parameters from a scan set to be consistent with signal characteristics defined by the mobility fingerprint data. For instance, the use of a path loss for measurements can correspond to one type of scaling, to help eliminate the absolute value problem that can arise from RSSI measurements. However, the use of path loss does not solve receiver and transmitter gain differences that may also be present. For example, it is likely that two different mobile units from two different manufacturers have antennas with different receiver gain characteristics. There are many other factors as well that can cause a skewing of the signal strength measurements. For the purpose of fingerprint evaluation described herein, it may be assumed that the transmissions from the APs remain consistent but that the mobile unit's receiver gain may vary. This assumption allows for the possibility to scale the measurements such that proportionally the data 208 from the fingerprint data set 406 can match the data from the SCANSet if they are proportionally equal.

As one example, the scaling component 422 may implement a sum scaling algorithm that works on the principle of converting each individual AP measurement into a weighted proportion of sum of all measurements. The scaling component can scale both the fingerprint RSS values and the measured RSS values so that they are evaluated to be a proportional match rather than an absolute match. The scaling component 422 thus can apply weighting to the scanned RSS values corresponding to the inverse of the scaled measured received signal strength. For instance, the scaling component 422 can scale each scanned RSS value (S_RSSi) in the SCANset to provide a Scaled S_RSS(i) as follows:

$$\text{Scaled } S\_RSS(i) = S\_RSSi / \Sigma S\_RSSm \qquad \text{Eq. 1}$$

where m=1 . . . j.
For the fingerprint RSS values found in the FPset can be scaled according to:

$$\text{Scaled } FP\_RSS(i) = FP\_RSSi / \Sigma FP\_RSSm \qquad \text{Eq. 2}$$

where m=1 . . . j
It will be appreciated that the scaling should only be applied to the set of APs that are included in both the SCANset and the fingerprint data set 406.

The scaling component 422 may also utilize a strongest AP scaling algorithm to scale the measured data provided by the measurements system 412. The strongest AP Scaling algorithm assumes that when any measurement scanning takes place, the resulting SCANset is a match to the fingerprint data 208 that is under evaluation. If the SCANset is a match, the strongest AP in the SCANset would also be a match. All other RSSI values in the SCANset can be scaled, by the difference of the strongest RSSI value in the SCANset and the corresponding RSSI value in the FPset. For example, the scaling component can determine a scale value to apply as follows:

$$\text{Scale Value} = S\_APm - FP\_APn \qquad \text{Eq. 3}$$

where: APm is the strongest AP in SCANset, and
FP_APn is the corresponding RSSI value from the FPset.

From Eq. 3, it follows that the scaling component 422 can scale each S_RSS(i) value, such as follows:

$$\text{Scaled } S\_RSS(i) = S\_RSS(i) + \text{Scale Value} \qquad \text{Eq. 4}$$

As further example, the scaling component 422 can also determine a scaling value for each device by measuring a constant source and taking the difference between a reference device and the test device. For instance, the fingerprint data set 406 can be generated when signals (defining a mobility fingerprint) are sampled at the roam zone by a given reference device having particular operating parameters. The mobile unit moving within the system or enterprise may be a different type of device than the reference device, such that certain parameters of the input 404 to the fingerprint detector 402 may require device scaling. For example, the scaling value for a given scanning device (or mobile unit) can be expressed as follows:

$$\text{Scale Value} = RSSI_{REF} - RSSI_{TEST} \qquad \text{Eq. 5}$$

where: $RSSI_{REF}$ is the measurement with the reference device, and
$RSSI_{TEST}$ is the same measurement for the test device (mobile unit)

From Eq. 5, the scaled value of the scanned RSSI value (S_RSSI(i)) can be represented as follows:

$$\text{Sealed } S\_RSS(i) = S\_RSS(i) + \text{Scale Value}. \qquad \text{Eq. 6}$$

In this approach, each supported device may either be configured with its measured scale value to be delivered with the fingerprint data 408.

Those skilled in the art will understand and appreciate other algorithms that may be utilized to perform scaling of measured parameters based on the teachings contained herein. Additionally or alternatively, scaling can be performed at the measurement system 412. Since fingerprint data can be associated with different roam zones, different scaling may be applied for different groups of the fingerprint data. The scaling component 422 provides the scaled input data to an evaluator 424.

The evaluator 424 is programmed and/or configured to determine if the mobility fingerprint defined by the input data at 404 substantially matches any of the fingerprint data 408. As used herein, the term "substantially" is intended to include minor variations or deviations in the associated term that is being modified, such as within a determinable variance. The evaluator 424 employs an evaluation algorithm that compares the instantaneous sampled data from inputs at 404 relative to the fingerprint data 408. The evaluation algorithm performed by the evaluator 424 can be implemented as logic on the mobile unit, logic in the network or as a combination of logic on the mobile unit and the network. Such logic further can be provided in the form of hardware (e.g., field programmable gate array (FPGA) or other logic structure), software (e.g., executable instructions stored in memory or running on a processor) or as a combination of hardware and software. The algorithm that is utilized can vary significantly depending on the data that was available at the time of generating the mobility fingerprint data 408. For example, different algorithms would likely be needed depending on whether the fingerprint information available is only data with respect to the roaming zones or whether the data covers the entire coverage area. This is because having a complete coverage data set allows the possibility to more accurately define the probability that a given roaming zone is detected against the total coverage area available.

The evaluator 424 can also include a calculator 428 programmed to calculate fingerprint parameters based on the input received at 404. The calculator 428 can be programmed with one or more algorithms 429 to compute the values consistent with the fingerprint data collection approached utilized to gather the fingerprint data 408. Examples of the types of algorithms that can be employed by the evaluator 424 and the calculator 428 are described below with respect to certain example embodiments. The calculator 428 can calculate fingerprint data for each of the signals provided with the input 404 or to a selected subset of the input signals corresponding to the input 404. For instance, a selected subset of a portion of the plurality of received signals can be identified based on the received signal strength (RSSI value) exceeding the threshold. The RSSI value, for instance can also be calculated by the calculator 428 to an appropriate scale (e.g., dBm, a predefined scale of 1 to 100 or the like).

Those skilled in the art wilt understand and appreciate various types of algorithms 429 that can be performed by the calculator 428 for use in evaluating the mobility fingerprint for a given mobile unit. The calculator 428 can perform calculations as a function of the signal values that may be calculated as well as the signal values defined by the fingerprint data 408. The comparator 430 can compare the calculated results relative to a threshold to determine if a match exists. The threshold, for example, may correspond to a histogram of fingerprint data or statistical methods may be employed to determine the likelihood of a match. The results of the evaluation are provided to a handoff trigger generator 432 that is configured to generate a trigger signal at 434 if the results of the evaluation indicate that the mobility fingerprints of the mobile unit matches the mobility fingerprint defined by any of the fingerprint data 408.

The evaluator 424 may also employ one or more discriminators 436 that can be utilized as part of the fingerprint data to help confirm the occurrence of a positive match between fingerprint data 408 and the inputs 404. For example, suitable discriminators 436 may include the RSSI for a given cell power, location information (e.g., location within a network or a global position), receiving a signal from a beacon or the strongest access point corresponding to the primary identifier to which the mobile unit has connected. These and other discriminators thus can be aggregated with the results of the calculator 428 to mitigate the likelihood of false positive matches.

The following example describes an approach where the fingerprint detector 402 is implemented on a mobile unit (e.g., a wireless client) when only the data for the roaming zones are available for a wireless network. In such an approach, the evaluator 424 requires an evaluation algorithm that can provide a metric to maximize accurate roam zone detection and minimize false positives. In this example, it is further assumed in the fingerprint data set 406 that nothing is known about the overall coverage area other than the number of APs in a given fingerprint data set and the corresponding RSS1. Because of the lack of a complete data set for the entire coverage area, the approach that will be described is a deterministic approach to evaluate against the small set of roaming zone fingerprint locations. Other fingerprint evaluation schemes may be utilized, such as a probabilistic approach (e.g., employing Bayes theorem) where the probability of being at the fingerprint location is evaluated. Additional discriminators may also be applied to help reduce the occurrence of false positive matches.

In order to accommodate the application of the deterministic evaluation to identify the potential match, plus the penalty of discriminators, the overall detection algorithm performed by the evaluator 424 can use a standard constraint-handling technique of evaluating both the feasible solution and an infeasible solution.

$$\text{Match} = \text{eval\_f}(\ ) + \text{eval\_i}(\ ) \quad \text{Eq. 7}$$

where: eval_f is the evaluation of the feasible solution, and eval_i( ) is the evaluation of the infeasible solution.

The basic algorithm operates on a fingerprint data set 406 that defines the possible roaming zones generally in range of the client's current location. This set of fingerprint data set 406 can be represented as follows:

$$FPset = (FP1, FP2, \ldots, FPn) \quad \text{Eq. 8}$$

where n is the total number of entries of fingerprint data 408 in the data set 406, and
FPi is the $i^{th}$ fingerprint data entry.

Each fingerprint data 408 has a specific fingerprint type, such as described herein. For the example of a fingerprint for a wireless network, fingerprint data 408 minimally contains a list of detected APs and corresponding received signal strength values, such as follows:

$$FPi = ((FP\_AP1, FP\_RSS1), (FP\_AP2, FP\_RSS2), \ldots, (FP\_APk, FP\_RSSk)) \quad \text{Eq. 9}$$

where k is the total number of detected APs for a given entry of fingerprint data 408.

For example, when the wireless client is in a state where roaming might be needed (e.g., during an active communication, such as a voice call), the wireless adapter can perform a periodic scan to generate an instantaneous nearest neighbor list. This instantaneous neighbor list (SCANset) can contain a list of detected APs and corresponding received signal strength (RSS) values, such as can be represented as follows:

$$SCANset = ((S\_AP1, S\_RSS1), (S\_AP2, S\_RSS2), \ldots, (S\_APj, S\_RSSj)) \quad \text{Eq. 10}$$

where: j is the total number of detected APs for the instantaneous scan,
S_APi is a single AP in the scan list, and
S_RSSi is the corresponding measured receive signal strength.

These two sets of data, FPset and SCANset, can define the primary inputs 404 provided to the fingerprint detector 402 and employed by the various algorithms to decide whether to trigger a handoff, for example, from the WiFi network to the cellular network (or vice versa). Two general classes of fingerprint detection algorithms include an effort to identify a well bounded area, such as an area supported by a wireless network. The output of this type of algorithm thus can be used as an indication that a mobile unit is currently located in that well bounded region. Another class of algorithm seeks to identify a boundary region. The output of this second type of algorithm can be used as an indication that a mobile unit is somewhere outside the boundary region (i.e. a much larger area). The boundary can correspond to a physical boundary or an RF boundary (e.g., based on signal strength for one or more signal, quality of connection and the like).

A distance vector algorithm is one example of an algorithm that can be implemented for the first category of fingerprint detection algorithm. The evaluator 424 can implement a distance vector algorithm to identify a well bounded area in the network, such as by the calculator 428 computing the sum of the differences of the distance from each AP during the instantaneous scan and the distance from each AP in the fingerprint. The comparator 430 can then compare the sum against an acceptable total allowed difference.

For the feasible solution component of Eq. 7, the calculator 428 can employ a weighted nearest neighbor algorithm to determine if any fingerprint matches exist. The nearest neighbor can be determined by calculating an appropriate distance metric, such as a Manhattan distance calculation, an Euclidean distance calculation, or a Chebyshev distance calculation to name a few. The overall distance calculation can be scaled to accommodate the variation in antenna gain for each mobile client in the network.

A feasible solution using the weighted nearest neighbor method exists only if the number of neighbors is three or greater. When the number of neighbors is less than three then the minimum signal strength method should be used. For instance, the calculator 428 can evaluate the minimum signal strength for the feasible solution, such as follows:

$$\text{Eval\_f}(\ ) = |\Sigma(1/S\_RSSi)(|S\_RSSi - FP\_RSSi|) \quad \text{Eq. 11}$$

For a valid feasible solution to exist, the result of Eq. 11 should be less than the worst case allowed differential from the fingerprint data. If it is not less than the worst case situation, then the Eval_f( ) value is infinite and, therefore, cannot produce a match. The worst case allowed differential can be calculated by the calculator 428 as follows:

$$\Sigma(1/FP\_RSSi)(\sigma i) \quad \text{Eq. 12}$$

where σi is the allowed RSSI variance for the ith AP.

It will be appreciated that the RSS values in both Eqs. 11 and 12 can be scaled values, such as described herein.

The infeasible solution evaluation from Eq. 7 can be utilized to incorporate some of the possible discriminators previously described. As described herein, the discriminators help reduce any false positives that may occur, such as by confirming the validity of the match provided by the feasible solution. A variety of factors can be considered as part of the infeasible solution evaluation. By way of example, the infeasible solution can evaluate missing APs in the instantaneous scan AP list and APs with high RSS in the instantaneous scan AP list that are not part of the fingerprint. The presence of other discriminators can also form part of the infeasible solution.

As yet another example, the evaluator 424 can employ a distance vector individual algorithm that is capable of identifying a bounded area. Rather than examining the sum of the differences, as in the preceding example, this algorithm compares the distance from each AP from the instantaneous scan and the distance from each AP in the fingerprint on an AP per AP basis. AP comparisons that are a match contribute to the feasible part of the evaluation while AP comparisons that do not match contribute to the infeasible part of the evaluation. For instance, the calculator 428 can employ an evaluation algorithm 429 that can be represented as follows:

$$\text{Eval} = \text{Eval\_f}(\ ) - \text{Eval\_i}(\ ) \quad \text{Eq. 13}$$

In this case, the resulting evaluation produces a sum of matches from the feasible solution minus mismatches from the infeasible solution. The comparator 430 can compare the Eval value against the total number of APs in the FPset to determine if a valid match exists. The percentage of matching APs is a configurable value.

By way of example, for the feasible solution component of Eq. 13, the calculator 428 can compute a difference of RSS values is compared against the allowed variance. This computation can be represented as follows:

$$\text{Eval\_f( )}=\Sigma\text{count}(|S\_RSSm-FP\_RSSn|<=\sigma n) \qquad \text{Eq. 14}$$

where: S_RSSm is the scanned RSS value for a given AP,
FP_RSSn is the RSS value from the fingerprint data 208, and
σn is the allowed variance for the RSS value associated with the given AP.

The result of Eq. 14 thus corresponds to a total count of SCANset measurement vectors that are within the allowed variance of the corresponding RSS value in the FPset. The RSS values can be scaled values.

For the infeasible solution component of Eq. 13, the calculator 428 can compute a difference of RSS values that is compared against the allowed variance. This computation can be represented as follows:

$$\text{Eval\_f( )}=\Sigma\text{count}(|S\_RSSm-FP\_RSSn|>\sigma n) \qquad \text{Eq. 15}$$

The result of Eq. 15 is the total count of SCANset measurement vectors that are outside the allowed variance of the corresponding RSS value in the FPset. Note that the RSS values in Eq. 15 can be scaled. Additionally, the allowed variance for Eqs. 14 and 15 may be the same or different variance values may be utilized for the feasible and infeasible solutions.

As yet a further example, the evaluator 424 can employ an algorithm 429 that is referred to as the strongest AP set algorithm. The strongest AP set algorithm falls into the category of algorithms that are capable of determining if a mobile unit is outside of a boundary region. The primary principle of this algorithm is that some portion of the AP's measured during the neighbor scan has a measured RSS that is less than the corresponding RSS value in the fingerprint data set 406. This general AP comparison is also governed by the strongest AP in the SCANset which must meet the criteria above. The evaluation algorithm can have the form of Eq. 13. In this case, the calculator 428 is programmed to produce a sum of matches (forming the feasible solution) minus mismatches (forming the infeasible solution). The comparator 430 then compares the Eval value against the total number of APs in the fingerprint data set 406 to determine if a valid match exists. The percentage of matching APs can be a configurable value.

By way of example, for the feasible solution component of Eq. 13, the algorithm 429 of the calculator 428 computes the Eval_f( ) value as a function of the SCANset RSS values and the RSS values in the fingerprint data set 406. This evaluation can be expressed as follows:

$$\text{Eval\_f( )}=\Sigma\text{count}(S\_RSSm<FP\_RSSn) \qquad \text{Eq. 16}$$

The result of Eq. 16 is the total count of SCANset measurement vectors that are less than the corresponding RSS value in the fingerprint data set 406.

By way of further example, the calculator 428 can determine the infeasible solution component of Eq. 13 by evaluating the SCANset RSS values relative to the FPset RSS values. This comparison can be represented as follows:

$$\text{Eval\_f( )}=\Sigma\text{count}(S\_RSSm\geq FP\_RSSn) \qquad \text{Eq. 17}$$

The result of Eq. 17 is an infeasible solution that represents the total count of SCANset measurement vectors that are greater than or equal to the RSS value in the FPset. It will be appreciated that the RSS values in Eqs. 16 and 17 can be scaled. The calculator 428 can compute the results of Eq. 13 as the difference between the count values produced by Eqs. 16 and 17 to identify whether a valid fingerprint match exists.

Figure 10:
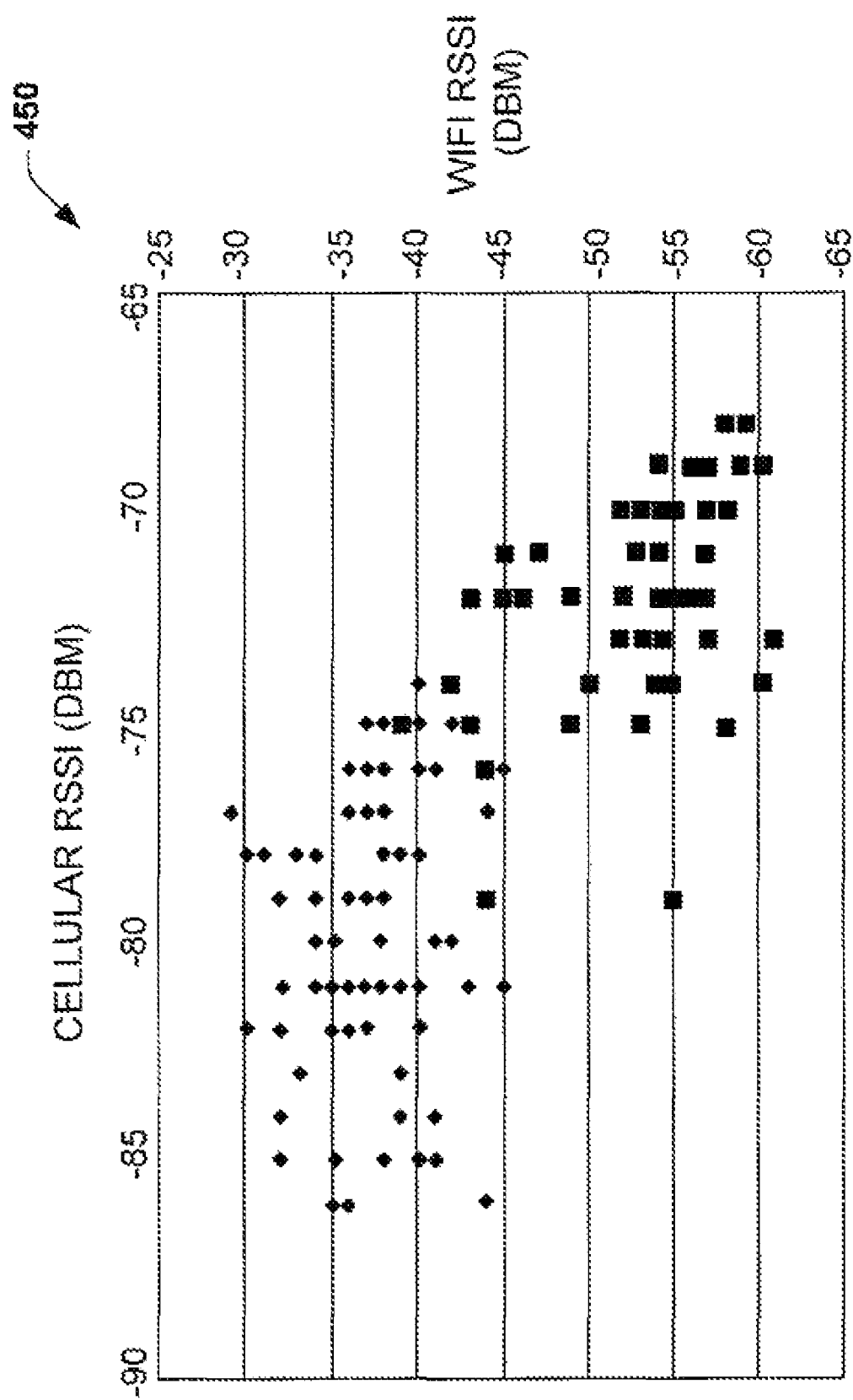
FIG. 10 is a graph plotting cellular received signal strength verses WiFi received signal strength that can be utilized to facilitate mobility fingerprint detection in accordance with an aspect of the invention.

Yet another algorithm that can be implemented to detect (or enhance detection of) a mobility fingerprint is a strong cell weak AP algorithm. The strong cell weak AP algorithm operates on the principal that at many roam zone locations the cellular radio signal becomes stronger while the AP signal becomes weaker. For example, this set of conditions can often be detected initially at the entrance and exit points of a building. FIG. 10 shows a plot, indicated at 450, of cellular signal strength and WiFi signal strength for data gathered for a typical enterprise building in which a WiFi wireless network is implemented. In FIG. 10, the diamonds represent measurements taken inside the building and squares represent measurements taken outside the building. This plot 450 demonstrates a distinct change in the relative signal strengths when inside the building versus when outside the building. One of the benefits of this algorithm is that no WiFi scanning of neighboring AP's is required since the WiFi evaluation only requires monitoring the connected AP for the mobile unit. For this algorithm, the connected AP RSSI and registered cellular tower RSSI is tracked against the values found in the static fingerprint with cellular tower information. The calculator 428 thus may evaluate the relative signal strengths as part of feasible solution Eval_f( ) that can be represented as follows:

$$\text{Eval\_f( )}=(conAP\_RSS<FP\_RSS)\&\&(regCell\_RSS>FP\_Cell\_RSS) \qquad \text{Eq. 18}$$

where: conAP_RSS is the RSS value for the connected AP,
regCell_RSS is the RSS value for the cellular station to which the client is connected, and
FP_Cell_RSS is the RSS value defined by the fingerprint data 208

It will be appreciated that the RSS values can be scaled values.

Since certain fingerprint detection algorithms may require a scan of neighboring base stations, the fingerprint evaluator 424 can include a prequalification block 426. The prequalification block 426 can include logic programmed to help reduce the amount of time the fingerprint detection algorithm requires for scanning. The prequalification block 426 can operate to determine if an expected received signal is absent from the mobility fingerprint for the fingerprint data 408. Fingerprint prequalification can leverage the fact that there is very little penalty for monitoring the RSSI of the currently connected AP or other base station. For example, if a mobile unit is connected to a given AP in a wireless network and the connected AP is not part of any fingerprint, such that there is no possibility of match between the input 404 and the fingerprint data 408, the fingerprint detector has no need to require scanning of the neighboring base stations. If all fingerprints show there is no possibility of a match, then there is no need to perform any scan. As a result of the prequalification 426, undesirable scanning that may cause a temporary disruption and an overall lower throughput in the detection process can be mitigated.

Additionally, or as an alternative, the prequalification block 426 can perform prequalification based on signal characteristics of one or more other received signal or on any combination of signals. In the event that the prequalification block 426 detects that a match may exist, the fingerprint defector 402 can cause the measurement system 412 or other associated circuitry to initiate appropriate scanning so that appropriate signals can be acquired for performing fingerprint detection. The fingerprint defector 402 can provide a control signal to the measurement system 412 directly or it can be provided to higher level control functions to enable the scanning. The prequalification block 426 may also be utilized to reduce the subset of fingerprint data such that, if there is no possibility of a match with a given fingerprint, additional calculations are not performed. Thus, the prequalification block 426 can help reduce the time and amount of processing required to evaluate mobility fingerprint for a mobile device.

Prequalification can vary depending on the particular fingerprint detection algorithm used. For example, some fingerprint detection algorithms, such as distance vector individual algorithm, can prequalify by testing if the connected AP's RSSI is substantially equal to the corresponding RSSI in the fingerprint data 408. Other fingerprint detection algorithms, such as the strongest AP set may prequalify by testing if the connected AP's RSSI is less than the corresponding RSSI in the fingerprint.

Mobility fingerprinting provides a mechanism that enables a communication session (e.g., a voice call using VoIP) to be kept on a first wireless technology (e.g., WLAN) until the mobile unit enters a roaming zone defined by predetermined fingerprint data. There may be times where the system does not detect that the mobile unit resides in the roaming zone, but none-the-less has entered an area where a handoff to a second radio technology (e.g., cellular) is required. For this case, the use of minimum signal strength can be employed in conjunction with mobility fingerprinting to ensure a handoff to cellular (or other radio technology) occurs. Depending on the time it takes to setup the cellular call relative the minimum signal level it is possible that the user may detect a short audio disconnection. The hope is that mobility fingerprinting provides the trigger for the majority of the roams so that tins situation can be avoided, however.

The concept of minimum signal strength is that at any given time the client must maintain a minimum level of signal to keep the voice call operating on the WLAN. If a client detects signal strength below the minimum level then it should transition to another available radio technology. Two methods of handling minimum signal strength can include a system wide minimum signal strength and an AP specific minimum signal strength.

By way of example, a worst case situation would be to apply system wide minimum signal strength criteria. Most voice enabled WLANs are configured to assure a minimum signal strength value in order to reliably provide a high level of service that is usually required to support a voice call. For instance, the minimum value is in the range of −65 dBm to −75 dBm for 802.11 b/g networks. A catch-all solution would be to provide a system level setting slightly less than this range to trigger roaming. This system level value can be distributed to the mobile units (e.g., wireless clients) connected to the RA server. The drawback to this approach is that the client may roam to cellular (or other supported radio technology) more often than is needed. Alternatively, it is possible that the client may not roam to cellular when it should. An example of this is when the wireless coverage leaks far outside of the desired coverage area, which is very common in today's networks.

An alternative solution to the system wide setting is to employ AP specific minimum values. By evaluating the data collected for mobility fingerprinting it is possible to determine what the minimum signal value would be for all the APs near roaming zones. The RA Client can use the roaming data to track the minimum value for each AP in which it is communicating and apply that criteria if fingerprinting missed a roaming transition.

Figure 11:
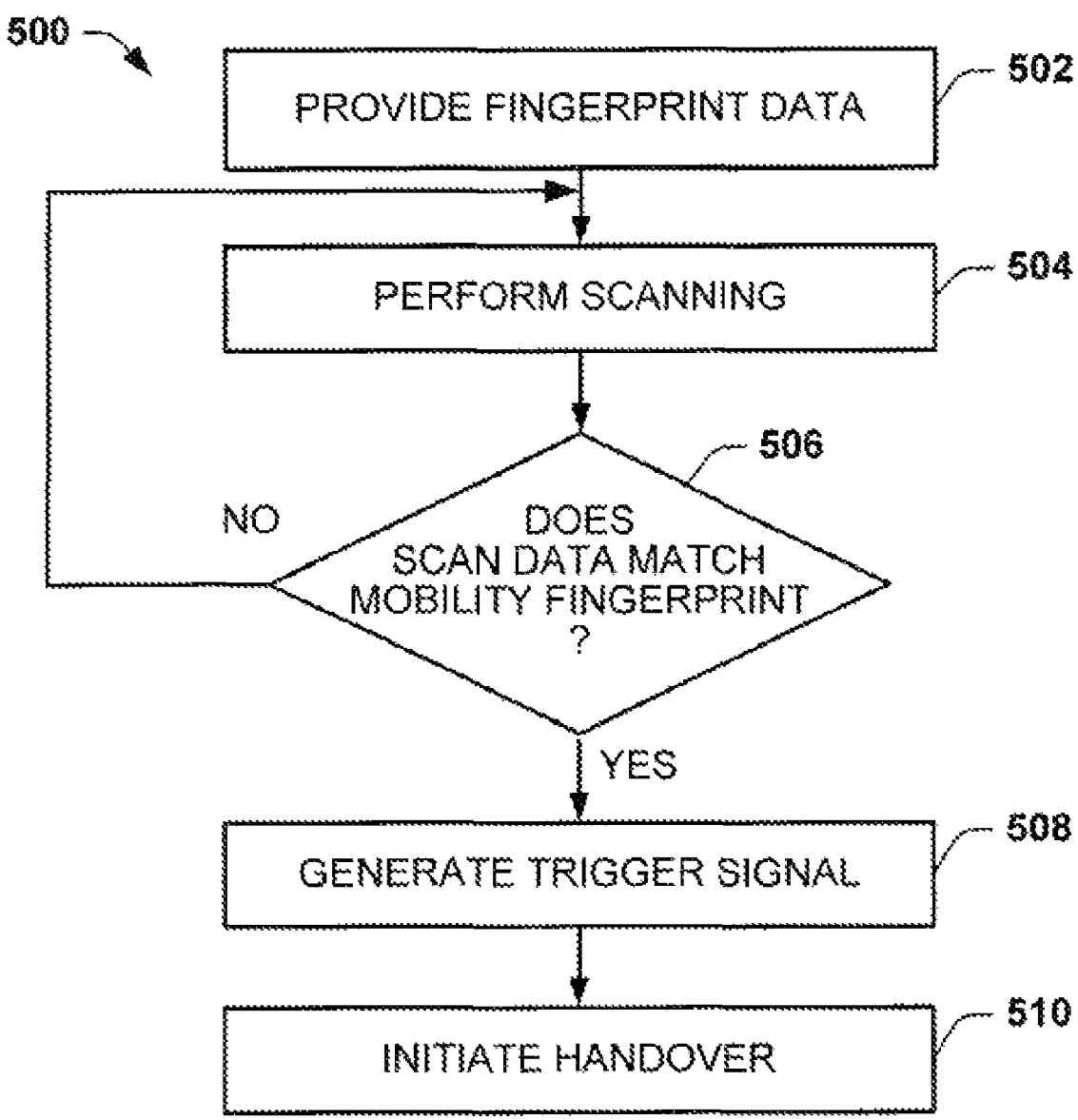
FIG. 11 is a flow diagram depicting a method in accordance with an aspect of the invention.

In view of the structural and functional features described above, certain methods will be better appreciated with reference to FIG. 11. It is to be understood and appreciated that the illustrated actions, in other embodiments, may occur in different orders or concurrently with other actions. Moreover, not all features illustrated in FIG. 11 may be required to implement a method according to the subject invention. It is to be further understood that the following methodology can be implemented in hardware (e.g., one or more processors, such as in a computer or a processor based device), software (e.g., stored in a computer readable medium or as executable instructions running on one or more processors), or as a combination of hardware and software.

FIG. 11 is a flow diagram depicting an example method 500 that can be employed to trigger a handover event according to an aspect of the invention. The method can be implemented by a mobile unit, by a network infrastructure or a combination thereof. The method begins at 502 in which a fingerprint data is provided. The fingerprint data defines at least one mobility fingerprint, such as can be generated from one or more signals associated with a predetermined roam zone where the handover event may need to occur. Each mobility fingerprint can be generated based on signals collected during a fingerprint gathering phase, such as described herein. The signals used to generate the mobility fingerprint can originate from different signal sources, which further may be different types of radio technologies.

At 504, after optional prequalification (e.g., described herein), scanning is performed to acquire a set of scan data. The scan data can include signal characteristics for any number of one or more signals, such as described herein. The set of scan data can be processed by a fingerprint evaluation algorithm, which processing can be performed by the mobile unit, by the network to which the mobile unit is connected or by a combination thereof. For example, at 506, the scan data is evaluated to determine whether the scan data substantially matches a mobility fingerprint defined by the fingerprint data. The evaluation at 506 can include evaluation of a feasible solution and an infeasible solution, such as described herein. A match indicates that a mobile unit resides within a predetermined roam zone.

If the evaluation at 506 indicates a match, at 508, a trigger signal can be generated to indicate a handover event from a first radio technology to a second radio technology may need to occur. That is, the trigger signal can be generated based on determining the set of scan data substantially matches a mobility fingerprint defined by the fingerprint data. At 510, a handover event for the mobile unit from the first radio technology to the second radio technology can be initiated in response to the trigger signal being generated at 508. The determination of whether to actually perform the handover event can be performed by higher level functions such as described herein.

In view of the foregoing, those skilled in the art will appreciate that systems and methods have been described to provide means for reliably determining when to switch between radio technologies for a mobile device. Various examples have been described that can be utilized to determine whether the device resides in a predetermined location or zone to help determine whether to trigger handoff to a new radio technology. Thus, the systems and methods described herein provide an efficient approach that can form part of an enterprise mobility solution.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. For example, while many examples and algorithms have been described with respect to triggering handover from a WLAN to a cellular network, those skilled in the art will understand that the approaches described herein are equally applicable to handover between any radio technologies. Accordingly, the invention is intended to embrace all such alterations, modifications and variations that fall within the scope of the appended claims. In the claims, unless otherwise indicated, the article "a" is to refer to "one or more than one."

What is claimed is:

1. A method to facilitate handover, comprising:
storing mobility fingerprint data in memory, the mobility fingerprint data representing signal characteristics associated with, at least one predetermined handover zone where a handover event from a first radio technology to a second radio technology may need to occur, the second radio technology being different from the first radio technology, where the at least one predetermined zone resides within a region of space that is a proper subset of an overlap in coverage areas of the first and second radio technologies;
detecting that a mobile unit resides within the at least one predetermined zone based on comparing signal characteristics relative to the mobility fingerprint data;
in response to detecting the mobile unit resides in the predetermined zone, determining whether to perform the handover event; and
initiating the handover event in response to determining to perform the handover event.

2. The method of claim 1, further comprising generating a trigger signal in response to the detecting that the mobile unit resides within the at least one predetermined zone.

3. The method of claim 2 wherein initiating the handover event comprises initiating the handover event for the mobile unit from the first radio technology to the second radio technology in response to the trigger signal being generated.

4. The method of claim 1, wherein the detecting that the mobile unit resides within the at least one predetermined zone is performed by the mobile unit.

5. The method of claim 1, wherein the detecting that the mobile unit resides within the at least one predetermined zone is performed by a radio system to which the mobile unit is currently connected according to the first radio technology.

6. The method of claim 5, further comprising storing the mobility fingerprint data in memory of the radio system, the stored fingerprint data representing at least one mobility fingerprint that defines the at least one predetermined zone where the handover event may need to occur, the radio system executing instructions to evaluate the mobility fingerprint data relative to a set of received signals to ascertain whether to trigger a handover event for the mobile unit.

7. The method of claim 1, further comprising defining at least one mobility fingerprint from at least one wireless signal associated with the at least one predetermined zone where the handover event may need to occur.

8. The method of claim 7, wherein the at least one mobility fingerprint comprises a set of signals originating from different signal sources.

9. The method of claim 8, wherein the different signal sources further comprise more than one type of radio technology.

10. The method of claim 7, further comprising storing fingerprint data in memory representing signal characteristics corresponding to the at least one mobility fingerprint.

11. The method of claim 10, wherein the fingerprint data further comprises a primary identifier and at least one secondary identifier, the method further comprising allocating a greater weight to the primary identifier than to the at least one secondary identifier in evaluating whether the mobile unit resides within the at least one predetermined zone.

12. The method of claim 10, further comprising loading a fingerprint data set into memory of the mobile unit for a given area in response to detecting the mobile unit is located within a boundary for the given area, the fingerprint data set comprising the fingerprint data that defines the at least one predetermined zone where the handover may need to occur for the given area.

13. The method of claim 12, further comprising specifying key data to enable an identification of a group of a plurality of predetermined roam, zones associated with the given area, the key data being transmitted from the mobile unit and causing a predetermined fingerprint data set to be downloaded into the memory of the mobile unit for the given area.

14. The method of claim 10, further comprising prequalifying the detecting by disabling at least a portion of a signal scan if at least one wireless signal does not result in a match with the fingerprint data and enabling at least a portion of the signal scan in response to detecting that the at least one wireless signal is substantially absent from representation by the fingerprint data.

15. The method of claim 10, wherein the signal characteristics further comprise path loss associated with at least one wireless signal transmitted within a wireless network with which the mobile unit is connected, the detecting further comprising evaluating path loss from a signal scan relative to the path loss represented by the fingerprint data to determine if the mobile unit resides within the at least one predetermined zone.

16. The method of claim 10, wherein the signal characteristics further comprise measured signal strength associated with at least one wireless signal transmitted within a wireless network with which the mobile unit is connected, the detecting further comprising evaluating the measured signal strength from a signal scan relative to the signal strength represented by the fingerprint data to determine if a handover event should be triggered for the mobile unit.

17. The method of claim 7, further comprising gathering measurement data associated with the at least one predetermined zone to define the mobility fingerprint.

18. The method of claim 17, wherein the gathering of the measurement data further comprises manually positioning a test device within the at least one predetermined zone to acquire a plurality of sample measurements from the at least one wireless signal, the mobility fingerprint for each predetermined zone being generated based on the plurality of sample measurements acquired for each respective predetermined zone.

19. The method of claim 17, wherein the gathering of the measurement data further comprises adaptively collecting a set of measurement data from each of a plurality of mobile units operating near the at least one predetermined zone, the mobility fingerprint for each predetermined zone being generated based on the plurality of sample measurements acquired for each respective predetermined zone.

20. The method of claim 17, wherein the gathering of the measurement data further comprises:
importing a set of predetermined measurement data that encompasses the at least one predetermined zone; and
identifying the at least one predetermined zone based on measurement data contained in the set of imported measurement data, the mobility fingerprint for each of the at least one predetermined zone being generated based on the measurement data corresponding to the identified at least one predetermined zone.

21. The method of claim 1, wherein the at least one predetermined zone is part of a first substantially bounded area of an enterprise, the enterprise comprising a plurality of substantially bounded areas, each of the plurality of substantially bounded areas including at least one predetermined zone where a handover event may need to occur for the respective bounded area, wherein different algorithms are employed for at least two of the plurality of substantially bounded areas for evaluating whether the mobile unit resides within the at least one predetermined zone of the respective bounded area.

22. The method of, claim 1, wherein the detecting further comprises calculating at least one feasible solution by evaluating data corresponding to scanned signal characteristics relative to mobility fingerprint data that defines the at least one predetermined zone.

23. The method of claim 22, further comprising evaluating the at least one feasible solution relative to a corresponding infeasible solution to confirm the validity of the at least one feasible solution.

24. The method of claim 23, further comprising:
collecting the mobility fingerprint data at a plurality of locations proximal to the at least one predetermined zone to define a fingerprint vector; and
determining directionality associated with the mobile unit based on the fingerprint vector, the determined directionality defining at least a portion of the corresponding infeasible solution.

25. A system to facilitate handover, comprising:
a mobile unit configured to operate according to at least first radio technology and a second radio technology; and
a fingerprint detector that evaluates input data relative to mobility fingerprint data that defines at least one predetermined roam zone that is a proper subset of overlap in coverage areas between the first and second radio technologies to determine whether to trigger a handover between the first and second radio technologies for the mobile unit based on an evaluation of the mobility fingerprint data relative to the input data.

26. The system of claim 25, further comprising a fingerprint data set that includes the mobility fingerprint data for an area that includes a plurality of roam zones, the fingerprint detector generating a trigger signal in response to evaluating the input data relative to the mobility fingerprint data in the fingerprint data set.

27. The system of claim 25, wherein the input data corresponds to scanned signal characteristics, the fingerprint detector further comprising an evaluator that computes at least one feasible solution by evaluating the scanned signal characteristics relative to predefined signal characteristics defined by the mobility fingerprint data.

28. The system of claim 27, wherein the evaluator further comprises at least one discriminator programmed to confirm the validity of the at least one feasible solution.

29. The system of claim 27, wherein the scanned signal characteristics result from at least one signal scan, wherein the evaluator further comprises prequalification logic operative to control performing the at least one scan.

30. The system of claim 25, wherein the input data corresponds to scanned signal characteristics resulting from at least one signal scan, the fingerprint detector further comprising a scaling component configured to scale the scanned signal characteristics consistent with signal characteristics defined by the mobility fingerprint data.

31. The system of claim 25, wherein the fingerprint detector further comprises executable instructions running on a processor of the mobile unit.

32. The system of claim 25, wherein the fingerprint detector further comprises executable instructions running on a computer that is part of a radio system to which the mobile unit is connected according to the first radio technology.

33. The system of claim 25, further comprising:
a wireless network that operates according to the first radio technology; and
a cellular system that operates according to the second radio technology.

34. A system to facilitate handover for a mobile unit, comprising:
means for storing fingerprint data that defines, a mobility fingerprint for at least one predetermined roam zone residing within a physical space that is a proper subset of an overlap of coverage areas of a first radio technology and a second radio technology; and
means for evaluating whether to trigger a handoff for the mobile unit from the first radio technology to the second radio technology based on an evaluation of the stored fingerprint data relative to data corresponding to at least one wireless signal that is associated with the mobile unit.

35. The system of claim 34, further comprising:
means for gathering measurement data associated with the at least one predetermined zone; and
means for generating the mobility fingerprint for each of the at least one predetermined zone.

* * * * *

UNITED STATES PATENT AND TRADEMARK OFFICE
CERTIFICATE OF CORRECTION

| | | |
|---|---|---|
| PATENT NO. | : 8,140,079 B2 | Page 1 of 1 |
| APPLICATION NO. | : 11/778831 | |
| DATED | : March 20, 2012 | |
| INVENTOR(S) | : Timothy S. Olson | |

It is certified that error appears in the above-identified patent and that said Letters Patent is hereby corrected as shown below:

Column 25, line 13, delete "with, at least" and insert --with at least--

Column 26, line 12, delete "roam, zones" and insert --roam zones--

Column 28, line 31, delete "defines, a mobility" and insert --defines a mobility--

Signed and Sealed this
Thirty-first Day of July, 2012

David J. Kappos
*Director of the United States Patent and Trademark Office*